(12) United States Patent
Hasejima et al.

(10) Patent No.: US 12,103,517 B2
(45) Date of Patent: Oct. 1, 2024

(54) IN-VEHICLE PROCESSING DEVICE AND MOVEMENT SUPPORT SYSTEM

(71) Applicant: Faurecia Clarion Electronics Co., Ltd., Saitama (JP)

(72) Inventors: Noriyasu Hasejima, Tokyo (JP); Takehito Ogata, Tokyo (JP); Toshihisa Kuwahara, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 165 days.

(21) Appl. No.: 16/824,163

(22) Filed: Mar. 19, 2020

(65) Prior Publication Data
US 2020/0353914 A1    Nov. 12, 2020

(30) Foreign Application Priority Data
Mar. 20, 2019    (JP) .................. 2019-052743

(51) Int. Cl.
*B60W 30/06*      (2006.01)
*B60W 40/105*     (2012.01)
*G01C 21/32*      (2006.01)

(52) U.S. Cl.
CPC .......... *B60W 30/06* (2013.01); *B60W 40/105* (2013.01); *G01C 21/32* (2013.01);
(Continued)

(58) Field of Classification Search
None
See application file for complete search history.

(56) References Cited

U.S. PATENT DOCUMENTS

| 6,405,132 B1* | 6/2002 | Breed ................ B60N 2/2863 |
| | | 701/45 |
| 6,526,352 B1* | 2/2003 | Breed ................ G01S 19/071 |
| | | 701/470 |

(Continued)

FOREIGN PATENT DOCUMENTS

CN    107735692    *  2/2018
DE    10 2013 015349 A1    4/2014
(Continued)

OTHER PUBLICATIONS

Min et al., Design and Implementation of an Intelligent Vehicle System for Autonomous Valet Parking Service, Sep. 10, 2015, 2015 10th Asian Control Conference (ASCC) (Year: 2015).*

(Continued)

*Primary Examiner* — Christian Chace
*Assistant Examiner* — Scott R Jagolinzer
(74) *Attorney, Agent, or Firm* — Volpe Koenig

(57) ABSTRACT

An in-vehicle processing device comprises a sensor input unit which acquires sensor information as an output of a sensor which acquires information around a vehicle, a movement information acquisition unit which acquires vehicle movement information as information related to a movement of the vehicle, a log recording unit which records information based on the vehicle movement information and the sensor information in a storage unit, a map generation unit which creates an environmental map including a drivable area where the vehicle can travel based on determination of static objects that do not move and mobile objects that can move by using information based on the vehicle movement information and the sensor information recorded in the storage unit, and a route calculation unit which calculates a travel route of the vehicle by using the envi- (Continued)

ronmental map, wherein the environmental map includes a position of parking the vehicle.

11 Claims, 18 Drawing Sheets

(52) U.S. Cl.
CPC ..... *B60W 2400/00* (2013.01); *B60W 2554/20* (2020.02); *B60W 2556/10* (2020.02); *B60W 2556/40* (2020.02); *B60W 2556/50* (2020.02)

(56) References Cited

U.S. PATENT DOCUMENTS

| | | | | |
|---|---|---|---|---|
| 9,581,997 | B1* | 2/2017 | Penilla | B60L 53/80 |
| 10,106,153 | B1* | 10/2018 | Xiao | G01S 17/89 |
| 10,777,051 | B1* | 9/2020 | Kumar | B64D 47/02 |
| 11,351,986 | B2 | 6/2022 | Sakano et al. | |
| 2005/0140524 | A1* | 6/2005 | Kato | G08G 1/096844 |
| | | | | 340/995.13 |
| 2011/0166737 | A1 | 7/2011 | Tanaka et al. | |
| 2012/0143456 | A1* | 6/2012 | Ueda | B60W 50/12 |
| | | | | 701/93 |
| 2013/0085637 | A1 | 4/2013 | Grimm et al. | |
| 2015/0350378 | A1* | 12/2015 | Hertel | G06F 16/29 |
| | | | | 709/203 |
| 2017/0284810 | A1* | 10/2017 | Altinger | G01C 21/3837 |
| 2017/0313306 | A1 | 11/2017 | Nordbruch | |
| 2017/0351267 | A1 | 12/2017 | Mielenz | |
| 2017/0365170 | A1* | 12/2017 | Lazic | G08G 1/143 |
| 2017/0370738 | A1* | 12/2017 | Park | G01C 21/3667 |
| 2018/0045521 | A1* | 2/2018 | Wege | G01C 21/32 |
| 2018/0056990 | A1* | 3/2018 | Elie | G05D 1/0246 |
| 2018/0188031 | A1* | 7/2018 | Samper | B60W 10/20 |
| 2018/0246515 | A1* | 8/2018 | Iwama | G05D 1/0221 |
| 2019/0135275 | A1* | 5/2019 | Park | G08G 1/0112 |
| 2019/0210594 | A1* | 7/2019 | Glebov | G08G 1/143 |
| 2019/0257659 | A1* | 8/2019 | Moteki | G06T 1/00 |
| 2019/0383941 | A1* | 12/2019 | Siddiqui | G01S 17/89 |
| 2020/0074729 | A1* | 3/2020 | Yan | G01S 17/89 |
| 2020/0284588 | A1* | 9/2020 | Sundar | G06K 9/00812 |

FOREIGN PATENT DOCUMENTS

| | | | |
|---|---|---|---|
| DE | 10 2013 223 417 | A1 | 6/2015 |
| EP | 3333049 | A1 | 6/2018 |
| JP | 2006-321291 | A | 11/2006 |
| JP | 2010-066932 | A | 3/2010 |
| JP | 2010-282344 | A | 12/2010 |
| JP | 2011-126473 | A | 6/2011 |
| JP | 2011-156955 | A | 8/2011 |
| JP | 2013-530867 | A | 8/2013 |
| JP | 2014-162451 | A | 9/2014 |
| JP | 2017-081425 | A | 5/2017 |
| JP | 2019-027845 | A | 2/2019 |

OTHER PUBLICATIONS

Banzhaf et al., The Future of Parking: A Survey on Automated Valet Parking with an Outlook on High Density Parking, Jun. 14, 2017, 2017 IEEE Intelligent Vehicles Symposium (IV) (Year: 2017).*
Nejad et al., Real Time Localization, Path Planning and Motion Control for Autonomous Parking in Cluttered Environment with Narrow Passages, Sep. 19, 2012, 2012 15th International IEEE Conference on Intelligent Transportation Systems (Year: 2012).*
Wahl et al., Localization inside a populated parking garage by using particle filters with a map of the static environment, Jul. 1, 2015, 2015 IEEE Intelligent Vehicles Symposium (IV) (Year: 2015).*
Royden et al., Detecting moving objects in an optic flow field using direction- and speed-tuned operators, Mar. 4, 2014, Elsevier (Year: 2014).*
Communication pursuant to Article 94(3) dated Jun. 23, 2021 for corresponding European Application No. 20164040.6 (6 pages).
Extended European Search Report dated Jul. 9, 2020 regarding European Patent Application No. 20164040.6 corresponding to U.S. Appl. No. 16/824,163 (10 pages).
Communication pursuant to Article 94(3) dated Feb. 24, 2022 issued in EP counterpart application No. 20164040.6 (9 pages).
Japanese Office Action issued on Nov. 29, 2022 for Japanese Patent Application No. 2019-052743.
Japanese Office Action issued on May 30, 2023 for Japanese Patent Application No. 2019-052743.
Chinese Office Action issued on Feb. 27, 2023 for Chinese Patent Application No. 202010203741.5.
Chinese Office Action dated Sep. 29, 2023 for Chinese Patent Application No. 202010203741.5.

* cited by examiner

| | | | X COORDINATE | Y COORDINATE |
|---|---|---|---|---|
| PARKING LOT 1 | LATITUDE: xxx, LONGITUDE: xxx | | | |
| | NAME | | X COORDINATE | Y COORDINATE |
| | PARKING AREA | VERTEX 1 | | |
| | | VERTEX 2 | | |
| | | VERTEX 3 | | |
| | | VERTEX 4 | | |
| | TRAVEL ROUTE | 1 | | |
| | | 2 | | |
| | | . | | |
| | | . | | |
| | LANDMARK | 1 | | |
| | | 2 | | |
| | | 3 | | |
| | | . | | |
| | | . | | |
| PARKING LOT 2 | LATITUDE: xxx, LONGITUDE: xxx | | | |
| | NAME | | X COORDINATE | Y COORDINATE |
| | PARKING AREA | VERTEX 1 | | |
| | | VERTEX 2 | | |
| | | VERTEX 3 | | |
| | | VERTEX 4 | | |
| | TRAVEL ROUTE | 1 | | |
| | | 2 | | |
| | | . | | |
| | | . | | |
| | LANDMARK | 1 | | |
| | | 2 | | |
| | | 3 | | |
| | | . | | |
| | | . | | |

--- LOCAL PERIPHERAL INFORMATION

—— PARKING LOT POINT GROUP
--- LOCAL PERIPHERAL INFORMATION

—— PARKING LOT POINT GROUP
--- LOCAL PERIPHERAL INFORMATION

IN-VEHICLE PROCESSING DEVICE AND MOVEMENT SUPPORT SYSTEM

CROSS-REFERENCE TO RELATED APPLICATION(S)

This application claims priority to Japanese Patent Application Number 2019-052743, filed on Mar. 20, 2019, the entire contents of which are incorporated herein by reference.

TECHNICAL FIELD

The present invention generally relates to an in-vehicle processing device, and a movement support system.

BACKGROUND ART

In recent years, activities for realizing the automatic driving of automobiles have become popular. In the automatic driving of vehicles, the surroundings of the vehicle are sensed by an external sensor such as a camera, an ultrasonic radar, or a radar, a determination is made based on the sensing result, and the vehicle travels autonomously without any user operation. In order to realize the automatic driving of vehicles, high-precision map information is generally required, and there are expectations for various business operators to prepare map information for the major highways. Nevertheless, for minor streets and travel paths within premises, the creation of high-precision map information and proper maintenance thereof cannot be expected. Thus, an assistance device for assisting the automatic driving of vehicles, which is not based on the premise of the existence of high-precision map information, is demanded.

PTL 1 discloses a method of supporting a driver of an automobile when the driver enters a parking space such as a garage by using a driver assistance device of the automobile, wherein, in a learning mode of the driver assistance device, while the automobile is being parked in the parking space based on the driving by the driver, a sensor device of the driver assistance device is used to record and store reference data regarding the periphery of the parking space, and, in the learning mode, the driver assistance device records a reference target position reached by the automobile, and stores data containing information regarding the reference target position, and, in a subsequent operation mode that differs from the learning mode, the driver assistance device records sensor data from the sensor device, compares the sensor data with the reference data, identifies the periphery of the parking space by using the recorded sensor data according to the comparison result, thereby determines a current position of the automobile relative to the reference target position, and, in accordance with the current position of the automobile relative to the reference target position, the driver assistance device determines the parking route of parking the automobile in the parking space from the current position according to the foregoing route.

CITATION LIST

Patent Literature

[PTL 1] Japanese Unexamined Patent Application Publication (Translation of PCT Application) No. 2013-530867

SUMMARY OF THE INVENTION

Problems to be Solved by the Invention

With the invention described in PTL 1, the optimal travel route cannot be used.

Means to Solve the Problems

The in-vehicle processing device according to the first mode of the present invention comprises a sensor input unit which acquires sensor information as an output of a sensor which acquires information around a vehicle; a movement information acquisition unit which acquires vehicle movement information as information related to a movement of the vehicle; a log recording unit which records information based on the vehicle movement information and the sensor information in a storage unit; a map generation unit which creates an environmental map including a drivable area where the vehicle can travel based on determination of static objects that do not move and mobile objects that can move by using information based on the vehicle movement information and the sensor information recorded in the storage unit; and a route calculation unit which calculates a travel route of the vehicle by using the environmental map, wherein the environmental map includes information of a parking position as a position of parking the vehicle.

The movement support system according to the second mode of the present invention includes an in-vehicle processing device mounted on a vehicle, and a server that is not mounted on the vehicle, wherein the in-vehicle processing device comprises: a sensor input unit which acquires sensor information as an output of a sensor which acquires information around the vehicle; a movement information acquisition unit which acquires vehicle movement information as information related to a movement of the vehicle; and an in-vehicle communication unit which sends information based on the vehicle movement information and the sensor information to the server, wherein the server comprises: a server communication unit which receives information based on the vehicle movement information and the sensor information from the in-vehicle processing device; a map generation unit which creates an environmental map including a drivable area where the vehicle can travel based on determination of static objects that do not move and mobile objects that can move by using information based on the vehicle movement information and the sensor information recorded in the storage unit; and a route calculation unit which calculates a travel route of the vehicle by using the environmental map, wherein the server communication unit sends the environmental map and the travel route to the in-vehicle processing device, and wherein the in-vehicle processing device further comprises: an automatic processing unit which controls the vehicle by using the environmental map and the travel route.

Advantageous Effects of the Invention

According to the present invention, calculation of the optimal travel route can be realized with an inexpensive computation device.

BRIEF DESCRIPTION OF DRAWINGS

FIG. 2 is a diagram showing an example of the parking lot point group 124A.

DESCRIPTION OF EMBODIMENTS

First Embodiment

The first embodiment of the in-vehicle processing device according to the present invention is now explained with reference to FIG. 1 to FIG. 13. In this embodiment, detailed map information is not created, and the area including the space for parking vehicles is referred to as a "parking lot" for the sake of convenience. The locations to which the present invention can be applied may also be an area that does not correspond to a "parking lot" prescribed under laws. Moreover, the term "parking lot" used in this embodiment, for example, may also include minor streets existing around the parking lot, and may additionally include highways.

Figure 1:
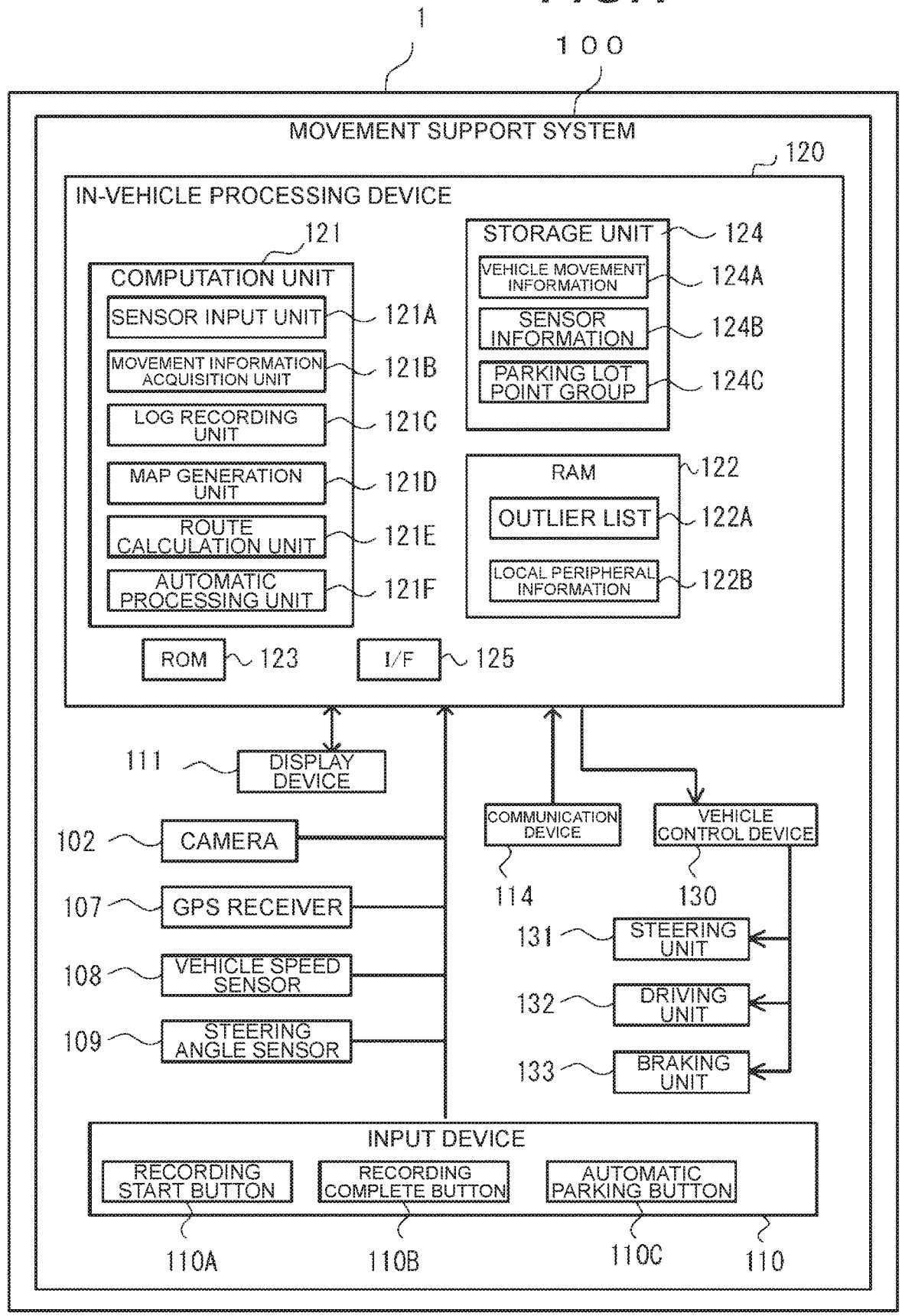
FIG. 1 is a configuration diagram of the movement support system 100.

FIG. 1 is a configuration diagram of a movement support system 100 including the in-vehicle processing device according to the present invention. The movement support system 100 is mounted on a vehicle 1. The movement support system 100 comprises a camera 102 which captures images around the vehicle 1, a GPS receiver 107, a vehicle speed sensor 108, a steering angle sensor 109, an input device 110, a display device 111, a communication device 114, and a vehicle control device 130. A steering unit 131, a driving unit 132, and a braking unit 133 are connected to the vehicle control device 130. As shown in FIG. 1, the respective devices are connected via a signal line, and send and receive various types of data to and from the in-vehicle processing device 120.

The in-vehicle processing device 120 comprises a computation unit 121, a RAM 122, a ROM 123, a storage unit 124, and an interface 125. The computation unit 121 is a CPU. The RAM 122 is a readable/writable storage area and operates as a main storage device of the in-vehicle processing device 120. The RAM 122 stores an outlier list 122A, which will be described later, and local peripheral information 122B, which will also be described later. The ROM 123 is a read-only storage area and stores the programs described later. The programs are expanded in the RAM 122 and executed by the computation unit 121. The computation unit 121 operates as a sensor input unit 121A, a movement information acquisition unit 121B, a log recording unit 121C, a map generation unit 121D, a route calculation unit 121E, and an automatic processing unit 121F by reading and executing the programs.

The computation unit 121 may also be realized with FPGA (Field Programmable Gate Array), which is a rewritable logical circuit, or ASIC (Application Specific Integrated Circuit), which is an integrated circuit for specific use, in substitute for the combination of CPU, ROM, and RAM. Moreover, the computation unit 121 may also be realized based on a combination of a different configuration, for example, a combination of CPU, ROM, RAM and FPGA, in substitute for the combination of CPU, ROM, and RAM.

The storage unit 124 is a non-volatile storage device and operates as an auxiliary storage device of the in-vehicle processing device 120. The storage unit 124 stores vehicle movement information 124A, sensor information 124B, and a parking lot point group 124C. The vehicle movement information 124A is an accumulation of information output by the vehicle speed sensor 108 and the steering angle sensor 109. The sensor information 124B is an accumulation of the captured images described later as information that is output by the camera 102. Note that, because the vehicle movement information 124A and the sensor information 124B are used as a combination, they are associated with some type of means and stored in the storage unit 124. For example, the time that the information was acquired may be added to the vehicle movement information 124A and the sensor information 124B, or the number of the processing cycle may be recorded.

The parking lot point group 124C is one or more parking lot data. The parking lot data is a set of location information of a certain parking lot, that is, latitude and longitude, coordinates indicating a parking area, and coordinates of points configuring a landmark existing in the parking lot. The landmark will be described later. As described later, the parking lot point group 124C is created by using the vehicle speed sensor 108 and the steering angle sensor 109. In the following explanation, a combination of information of all landmarks in a certain parking lot is referred to as an "environmental map".

The interface 125 exchanges information between the in-vehicle processing device 120 and the other devices configuring the movement support system 100.

The camera 102 outputs an image obtained through photography (hereinafter referred to as a "captured image") to the in-vehicle processing device 120. The in-vehicle processing device 120 performs landmark positioning described later using the images captured by the camera 102. Internal parameters such as the focal length of the camera 102 and the image sensor size and external parameters such as the mounting position and mounting posture of the camera 102 to the vehicle 1 are known and stored in the ROM 123 in advance. The in-vehicle processing device 120 can calculate the positional relationship between the subject and the camera 102 using the internal parameters and the external parameters stored in the ROM 123.

The GPS receiver 107 receives signals from a plurality of satellites configuring the satellite navigation system, and calculates the position of the GPS receiver 107, that is, the latitude and longitude, based on the received signals. Note that the accuracy of latitude and longitude calculated by the GPS receiver 107 does not have to be of high accuracy, and may include an error of, for example, several m to 10 m. The GPS receiver 107 outputs the calculated latitude and longitude to the in-vehicle processing device 120.

The vehicle speed sensor 108 and the steering angle sensor 109 measure the vehicle speed and the steering angle of the vehicle 1 and output them to the in-vehicle processing device 120. The in-vehicle processing device 120 calculates the amount of movement and the direction of movement of the vehicle 1 by a known dead reckoning technique using the outputs of the vehicle speed sensor 108 and the steering angle sensor 109.

The operation command to the in-vehicle processing device 120 by the user is input to the input device 110. Input device 110 includes a recording start button 110A, a recording completion button 110B, and an automatic parking button 110C. The display device 111 is a liquid crystal display, for example, and displays information output from the in-vehicle processing device 120. Note that the input device 110 and the display device 111 may be integrated as, for example, a liquid crystal display which enables a touch operation. In the foregoing case, it may be determined that the recording start button 110A, the recording completion button 110B, or the automatic parking button 110C has been pressed as a result of a predetermined area of the liquid crystal display being pressed.

The communication device 114 is used so that an external device of the vehicle 1 and the in-vehicle processing device 120 can exchange information wirelessly. For example, the computation unit 121 receives inferential parameters obtained based on machine learning for use in object recognition.

The vehicle control device 130 controls the steering unit 131, the driving unit 132, and the braking unit 133 based on the operation command of the in-vehicle processing device 120. The steering unit 131 operates the steering of the vehicle 1. The driving unit 132 applies driving force to the vehicle 1. For example, the driving unit 132 increases the driving force of the vehicle 1 by increasing the target rotational speed of the engine mounted on the vehicle 1. The braking unit 133 applies braking force to the vehicle 1.

The sensor input unit 121A and the movement information acquisition unit 121B can also be realized by using the interface 125 in addition to using the CPU and other components. The sensor input unit 121A acquires sensor information, or captured images, as the output of the camera 102 as the sensor that acquired information around the vehicle 1. The movement information acquisition unit 121B acquires the vehicle movement information 124A, which is information related to the movement of the vehicle 1, from the vehicle speed sensor 108 and the steering angle sensor 109.

The log recording unit 121C records the vehicle movement information 124A and the sensor information in the storage unit 124. The map generation unit 121D creates, and records in the storage unit 124, an environmental map including a drivable area where the vehicle can travel based on determination of static objects that do not move and mobile objects that can move by using the information based on the vehicle movement information 124A and the sensor information recorded in the storage unit 124. The route calculation unit 121E calculates, and records in the storage unit 124, the travel route of the vehicle 1 by using the environmental map.

The automatic processing unit 121F controls the vehicle 1 by performing computation using the environmental map and the travel route, and outputting an operation command to the vehicle control device 130.

(Landmark Positioning)

A landmark is an object having a feature that can be identified by a sensor, such as a parking space line, which is a kind of road marking paint, and a building wall, which is an obstacle that hinders vehicle travel. In this embodiment, vehicles and humans that are moving objects are not included in the landmark. The in-vehicle processing device 120 detects landmarks existing around the vehicle 1 based on information input from the camera 102, that is, points having features that can be identified by a sensor. In the following explanation, detection of a landmark based on information input from the camera 102 as an external sensor is referred to as "landmark positioning".

The in-vehicle processing device 120 detects a road marking paint of a parking space or the like by operating an image recognition program as follows for a captured image of the camera 102. To detect a parking space, first, an edge is extracted from an input image by using a Sobel filter or the like. Next, for example, a pair of an edge rising which is a change from white to black and an edge falling which is a change from black to white is extracted. When the distance between the pair is substantially equal to a pre-set first predetermined distance, that is, the thickness of the white line configuring the parking space, the pair is determined as a parking space candidate. A plurality of parking space candidates are detected by the same process, and when the interval between the parking space candidates is substantially the same as the pre-set second predetermined distance, that is, the white line interval of the parking space, these are detected as parking spaces. Road surface paint other than the parking space is detected by an image recognition program that executes the following processing. First, an edge is extracted from the input image by using a Sobel filter or the like. The edge can be detected by searching for pixels whose edge strength is larger than a predetermined value and the distance between the edges is a predetermined distance corresponding to the width of the white line.

The in-vehicle processing device 120 detects a vehicle or a human by known template matching, for example, and excludes it from the measurement result. Moreover, a moving object detected as follows may also be excluded from a measurement result. In other words, the in-vehicle processing device 120 calculates the positional relationship between the subject in the captured image and the camera 102 using the internal parameters and the external parameters. Next, the in-vehicle processing device 120 calculates the relative speed between the vehicle 1 and the subject by tracking the subject in the captured images continuously acquired by the camera 102. Finally, the in-vehicle processing device 120 calculates the speed of the vehicle 1 using the outputs of the vehicle speed sensor 108 and the steering angle sensor 109, and determines that the subject is a moving object if it does not match the relative speed with the subject. The information regarding this moving object is excluded from the measurement results.

Note that, in this embodiment, high-load computation is also possible because real-time processing is not performed. For example, when the filming of 30 frames per second is performed, the processing of one captured image needs to be completed within 33 miliseconds, and, with an application for vehicles in which the mounting of an expensive computing unit with high throughput is difficult, there is no choice but to limit the computation to be of a low load. Nevertheless, because so-called offline processing is performed in this embodiment, it is possible to repeatedly execute a plurality of processing or recognize objects based on inference using a learning model obtained based on machine learning. This recognition of objects includes, for example, the recognition of automobiles, humans, bicycles, walls, guard rails, and buildings, and the first three are recognized as moving objects, or mobile objects, and the remaining items are recognized as non-moving objects, or static objects.

(Parking Lot Point Group 124C)

FIG. 2 is a diagram illustrating an example of the parking lot point group 124C stored in the storage unit 124. FIG. 2 shows an example in which two parking lot data are stored as the parking lot point group 124C. One parking lot data is composed of the position of the parking lot, that is, latitude and longitude (hereinafter referred to as "latitude and longitude"), coordinates of the parking area, travel route of the vehicle 1, and coordinates on the two-dimensional plane of the points configuring the landmark.

The position of the parking lot is, for example, the vicinity of the entrance of the parking lot, the vicinity of the center of the parking lot, or the latitude and longitude of the parking position. The coordinates of the parking area, the travel route of the vehicle 1 and the coordinates of the points configuring the landmark are coordinates in a coordinate system unique to the parking lot data. In the following explanation, the coordinate system in the parking lot data is referred to as a "parking lot coordinate system" or a "first coordinate system". In the parking lot coordinate system, for example, the coordinates of the vehicle 1 at the start of recording are the origin, the forward traveling direction of the vehicle 1 at the start of recording is the Y axis, and the right direction of the vehicle 1 at the start of recording is the X axis. The coordinates of the parking area are recorded as the coordinates of the four vertices of the rectangular area when the parking area is rectangular, for example. However, the parking area is not limited to a rectangle, but may also be a polygon or an ellipse other than a rectangle. Moreover, the information to be recorded in the parking lot point group 124C may also be the parking position indicating the representative point, for example, the center point of the parking area, in substitute for the parking area which represents a broad area.

The travel route of the vehicle 1 stored in the storage unit 124 is information showing the ideal route from near the entrance of the parking lot to the parking position, and, for example, is an aggregate of coordinates for each fixed distance of that route. A fixed distance is, for example, 0.1 m or 0.5 m. However, a mathematical formula or parameters indicating the route may also be used in substitute for the coordinates. This route can be obtained based on the computation described later. In this embodiment, coordinates on the route closest to the entrance of the parking lot are stored in the record at the top of the travel route, that is, the record indicated as "1", and coordinates on the route closest to the parking area are stored at the bottom.

(Local Peripheral Information 122B)

The local peripheral information 122B stores the coordinates of points configuring landmarks detected by the in-vehicle processing device 120 in the automatic parking phase described later. The coordinates are a coordinate system based on the position and orientation of the vehicle 1 when the recording of the local peripheral information 122B is started, for example, with the position as the origin, the traveling direction of the vehicle 1 as the Y axis, and the forward traveling direction right as the X axis. In the following explanation, this coordinate system is referred to as a "local coordinate system" or a "second coordinate system".

(Recording Phase)

Figure 3:
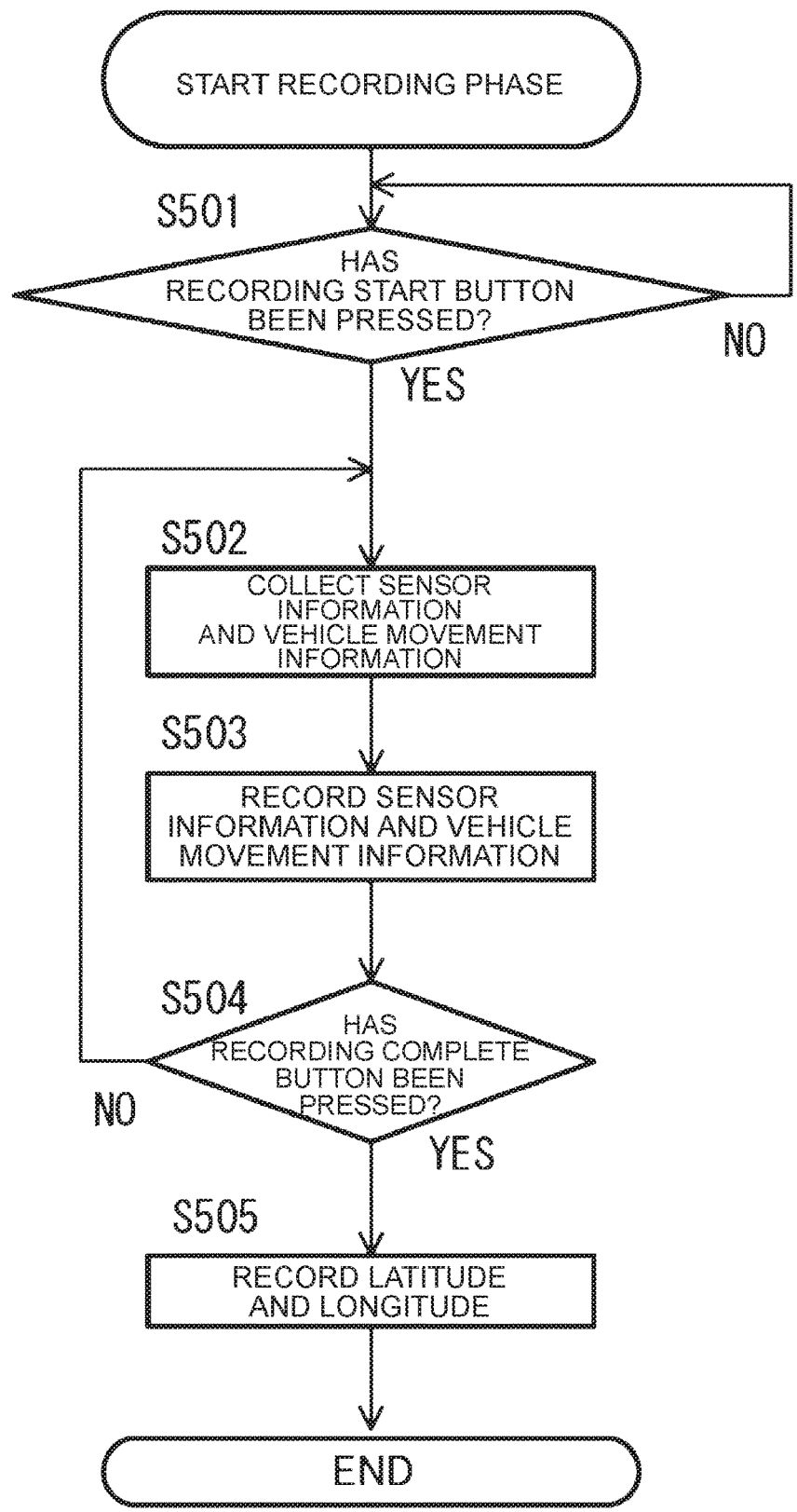
FIG. 3 is a flowchart showing the operation in the recording phase.

FIG. 3 is a flowchart showing the operation in the recording phase of the in-vehicle processing device 120. The execution subject of each step described below is the computation unit 121 of the in-vehicle processing device 120. In the following explanation, the computation unit 121 functions as the sensor input unit 121A and the movement information acquisition unit 121B in step S502, and functions as the log recording unit 121C in step S503.

In step S501, the computation unit 121 determines whether the recording start button 110A has been pressed. The computation unit 121 proceeds to step S502 upon determining that the recording start button 110A has been pressed, and remains in step S501 upon determining that the recording start button 110A has not been pressed. In step S502, the computation unit 121 acquires sensor information from the camera 102, and acquires vehicle movement information from the vehicle speed sensor 108 and the steering angle sensor 109. In subsequent step S503, the computation unit 121 records the sensor information and the vehicle movement information obtained in step S502 in the storage unit 124.

In subsequent step S504, the computation unit 121 determines whether the recording complete button 110B has been pressed. The computation unit 121 proceeds to step S505 upon determining that the recording complete button 110B has been pressed, and returns to step S502 upon determining that the recording complete button 110B has not been pressed.

In step S505, the computation unit 121 acquires the current latitude and longitude of the vehicle 1 from the GPS receiver 107 and records the acquired latitude and longitude in the storage unit 124, and then ends the processing shown in FIG. 3. Note that the information repeatedly recorded in step S503 and the information recorded in step S505 are associated and recorded.

(Post-Processing Phase)

Figure 4:
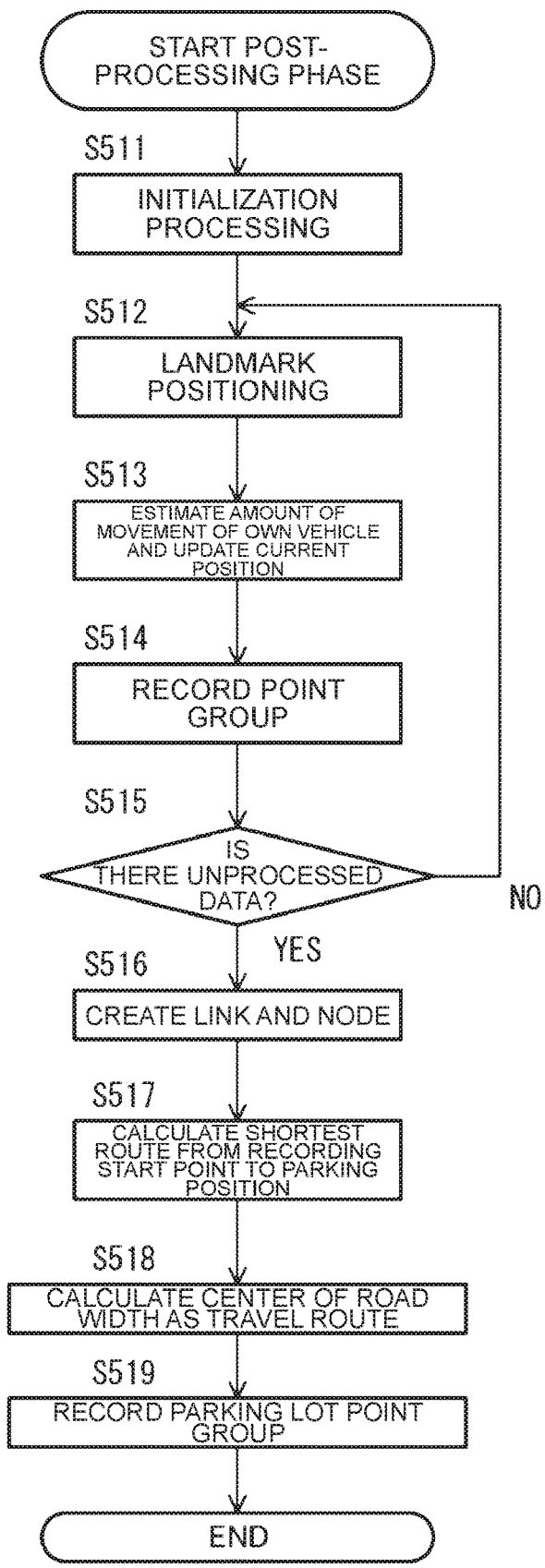
FIG. 4 is a flowchart showing the operation in the post-processing phase.

FIG. 4 is a flowchart showing the operation in the post-processing phase of the in-vehicle processing device 120. The execution subject of each step described below is the computation unit 121 of the in-vehicle processing device 120. In the following explanation, the computation unit 121 functions as the map generation unit 121D when performing the processing of steps S511 to S515, and functions as the route calculation unit 121E when performing the processing of steps S516 to S518. In this embodiment, when the recording phase is ended and the ignition switch of the vehicle 1 is turned OFF by the user, the computation unit 121 starts the processing of the post-processing phase.

In step S511, the computation unit 121 secures a new recording area in the RAM 122. In this storage area, the extracted point group and the actual travel route of the vehicle 1 are recorded in the coordinates of the local coordinate system described above. Note that, in the loop of steps S512 to S515 below, the vehicle movement information 124A and the sensor information 124B recorded in the storage unit 124 are read in order from the oldest information, that is, from information that is closer to the entrance of the parking lot.

In step S512, the computation unit 121 acquires the oldest unprocessed sensor information among the sensor information recorded in the storage unit 124 and performs the foregoing landmark positioning, that is, extraction of the point group configuring the landmark by using the captured images of the camera 102. In subsequent step S513, the computation unit 121 acquires the oldest unprocessed vehicle movement information among the vehicle movement information recorded in the storage unit 124 and estimates the amount of movement of the vehicle 1, and updates the current position of the vehicle 1 recorded in the RAM 122.

Note that the amount of movement of the vehicle 1 may also be estimated without using the vehicle movement information and, for example, the amount of movement of the vehicle 1 can be estimated from the change in the position of the subject existing on the road surface in the captured image of the camera 102. Further, when a high-precision GPS receiver with a small error is mounted as the GPS receiver 107, the output thereof may be recorded as the vehicle movement information and used. The computation unit 121 then proceeds to step S514.

In step S514, the computation unit 121 stores the point group extracted in step S512 in the RAM 122 as the coordinates of the local coordinate system based on the current position updated in step S513. In subsequent step S515, the computation unit 121 determines whether unprocessed sensor information exists in the storage unit 124. The computation unit 121 returns to step S512 upon determining that there is unprocessed sensor information, and proceeds to step S516 upon determining that there is no unprocessed sensor information.

In step S516, the computation unit 121 creates links and nodes of the parking lot as the processing target by using the point groups repeatedly recorded in step S514. The links and the nodes can be obtained, for example, by performing thinning processing to the drivable area in the parking lot. The point of intersection obtained based on the thinning processing is the "node", and the line segment that connects the nodes is the "link". The term "drivable area" in the parking lot is the area to the landmark measured from the travel route of the vehicle 1. However, even when it is behind the measured landmark, this will not apply if the vehicle 1 moved there and measurement was performed. Furthermore, an occupancy grid map may also be used for calculating the drivable area.

In subsequent step S517, the computation unit 121 uses the links and the nodes calculated in step S516 and calculates the shortest route from the recording start point to the parking position. Various known techniques may be used for this route calculation. In subsequent step S518, the computation unit 121 calculates the coordinates of the center of the road width in the route calculated in step S517 as the coordinates of the travel route of the vehicle.

In subsequent step S519, the computation unit 121 calculates the parking area of the vehicle 1 in the local coordinate system, and records the result as the parking lot point group 124C in the storage unit 124 together with the point groups repeatedly recorded in the RAM 122 in step S514 and the coordinates of the travel route of the vehicle 1 calculated in step S518. Note that the parking area of the vehicle 1 in the local coordinate system can be calculated by using the size of the vehicle 1, which is known, because the last position updated in step S513 is the parking area of the vehicle 1. The post-processing phase shown in FIG. 4 has been explained above.

Note that, as described above, the information of all landmarks of one parking lot of the parking lot point group 124C is collectively referred to as an "environmental map". Because the environmental map is obtained from the result of the landmark positioning of step S512, it is created based on the determination of static objects that do not move and the mobile objects that can move. Specifically, the mobile objects that can move are excluded as follows and only the static objects that do not move are reflected in the environmental map.

An object that was actually moving during the execution of the recording phase, that is, the subject of the camera 102, is determined to be a moving object as the speed of the subject and the speed of the vehicle 1 do not coincide, and excluded from the measurement result. An object that can move but was still during the execution of the recording phase is determined to be a moving object based on inference using template matching or a learning model, and excluded from the measurement result. Moreover, because the coordinates of obstacles are listed in the environmental map and it is known that the origin of the local coordinate system is the position of the vehicle 1 at the time recording is started and drivable, it could be said that the environmental map includes information of the drivable area where the vehicle 1 can travel. Accordingly, it could be said that an environmental map "includes a drivable area where the vehicle 1 can travel based on the determination of static objects that do not move and the mobile objects that can move".

(Automatic Parking Phase)

Figure 5:
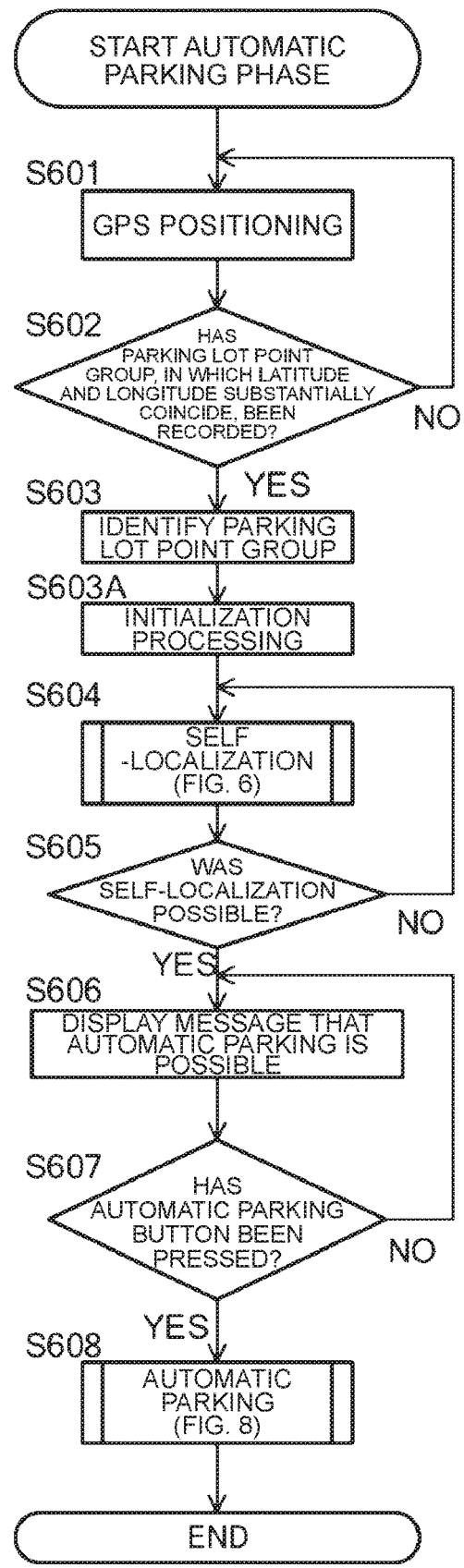
FIG. 5 is a flowchart showing the overall operation in the automatic parking phase.

FIG. 5 is a flowchart showing the overall operation in the automatic parking phase of the in-vehicle processing device 120. The execution subject of each step described below is the computation unit 121 of the in-vehicle processing device 120. The computation unit 121 executes the processing shown in FIG. 5 as the automatic processing unit 121F.

The computation unit 121 of the in-vehicle processing device 120 first measures the current latitude and longitude using the GPS receiver 107 (step S601), and then determines whether the latitude and longitude substantially match the latitude and longitude of any parking lot data in the parking lot point group 124C. In other words, the computation unit 121 determines whether a parking lot exists within a predetermined distance from the position of the vehicle 1 (step S602). When it is determined that the latitude and longitude of any parking lot data and the latitude and longitude of the vehicle 1 substantially match, the computation unit 121 proceeds to step S603, and when it is determined that the latitude and longitude of any parking lot data do not substantially match, the computation unit 121 returns to step S601. In the case of returning to step S601, there is a possibility that a positive determination may be obtained in step S602 when the vehicle 1 is moved as a result of being driven by the user.

Subsequently, the computation unit 121 of the in-vehicle processing apparatus 120 specifies the parking lot data which has the latitude and longitude which substantially correspond with the current position of the vehicle 1 among several parking lot data contained in the parking lot point group 124C (step S603). Next, the computation unit 121 of the in-vehicle processing apparatus 120 initializes the local peripheral information 122A stored in the RAM 122 and initializes the current position of the vehicle 1 stored in the RAM 122 as initialization processing (S603A). Specifically, if the previous information is recorded, it is deleted and a new coordinate system is set. In this embodiment, this coordinate system is referred to as a local coordinate system.

This local coordinate system is set based on the position and posture of the vehicle 1 when step S603A is executed. For example, the position of the vehicle 1 when step S603A is executed is set as the origin of the local coordinate system, and the X axis and the Y axis are set according to the orientation when step S603A is executed. The initialization of the current position of the vehicle 1 is performed by setting the current position of the vehicle 1 to the origin (0, 0).

Figure 6:
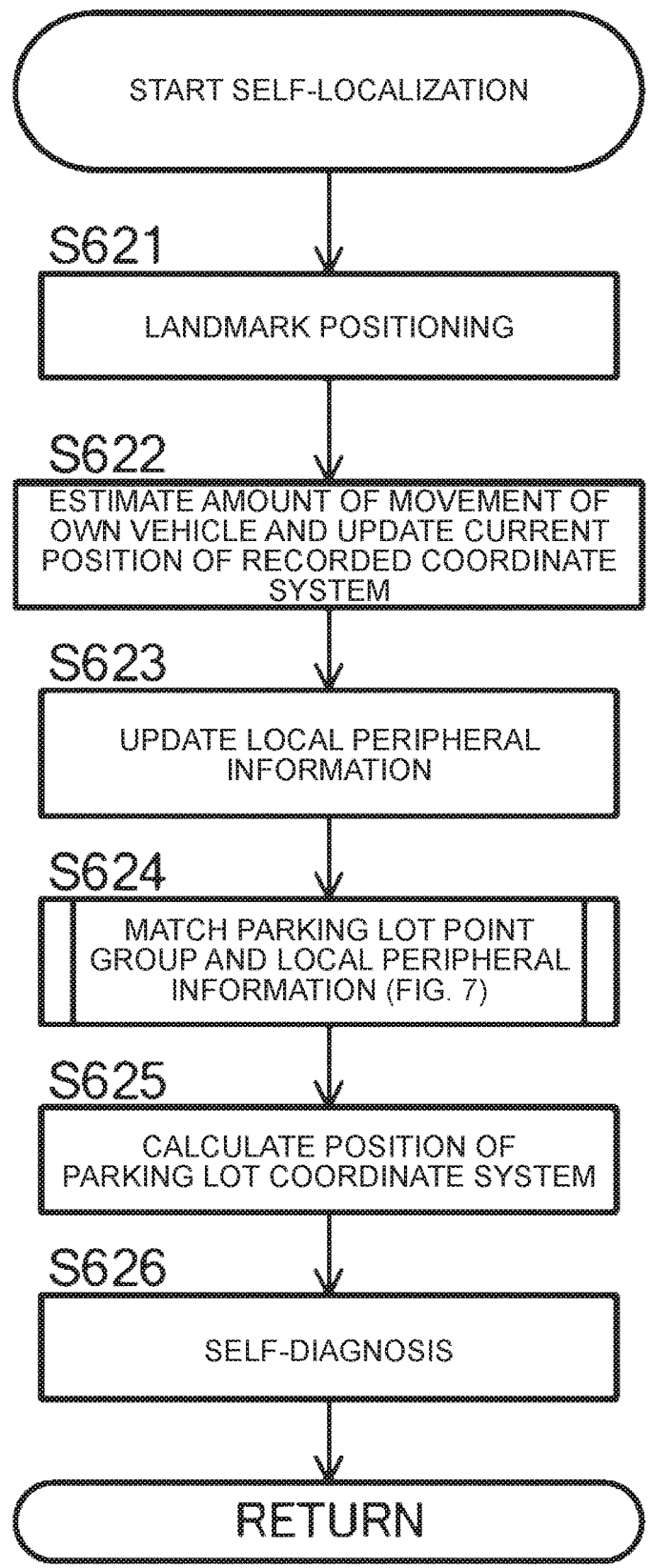
FIG. 6 is a flowchart showing the self-localization processing in the automatic parking phase.

Next, self-localization according to the routine shown in FIG. 6, that is, estimation of the position of the vehicle 1 in the parking lot coordinate system, is performed (step S604). In subsequent step S605, the computation unit 121 of the in-vehicle processing apparatus 120 determines whether the self-position has been estimated. When it is determined that it was possible to estimate the self-position, the computation unit 121 proceeds to step S606. When it is determined that it was not possible to estimate the self-position, the computation unit 121 returns to step S604.

In step S606, the computation unit 121 of the in-vehicle processing device 120 displays a message on the display device 111 to the effect that automatic parking is possible, and in subsequent step S607, determines whether the automatic parking button 110C has been pressed by the user. When it is determined that the automatic parking button 110C has been pressed, the computation unit 121 proceeds to step S608 to execute the automatic parking processing according to the routine shown in FIG. 8, and when it is determined that the automatic parking button 110C has not been pressed, the computation unit 121 returns to step S606.

(Self-Localization)

Details of the self-localization processing executed in step S604 of FIG. 5 are now explained with reference to FIG. 6. The landmark positioning in step S621, the estimation of the amount of movement of the own vehicle in step S622, and the recording of the local peripheral information 122A in step S623 are substantially the same as the processing in steps S512 to S514 in FIG. 4. The difference is that data stored in the RAM 122 is recorded as the local peripheral information 122B.

Figure 7:
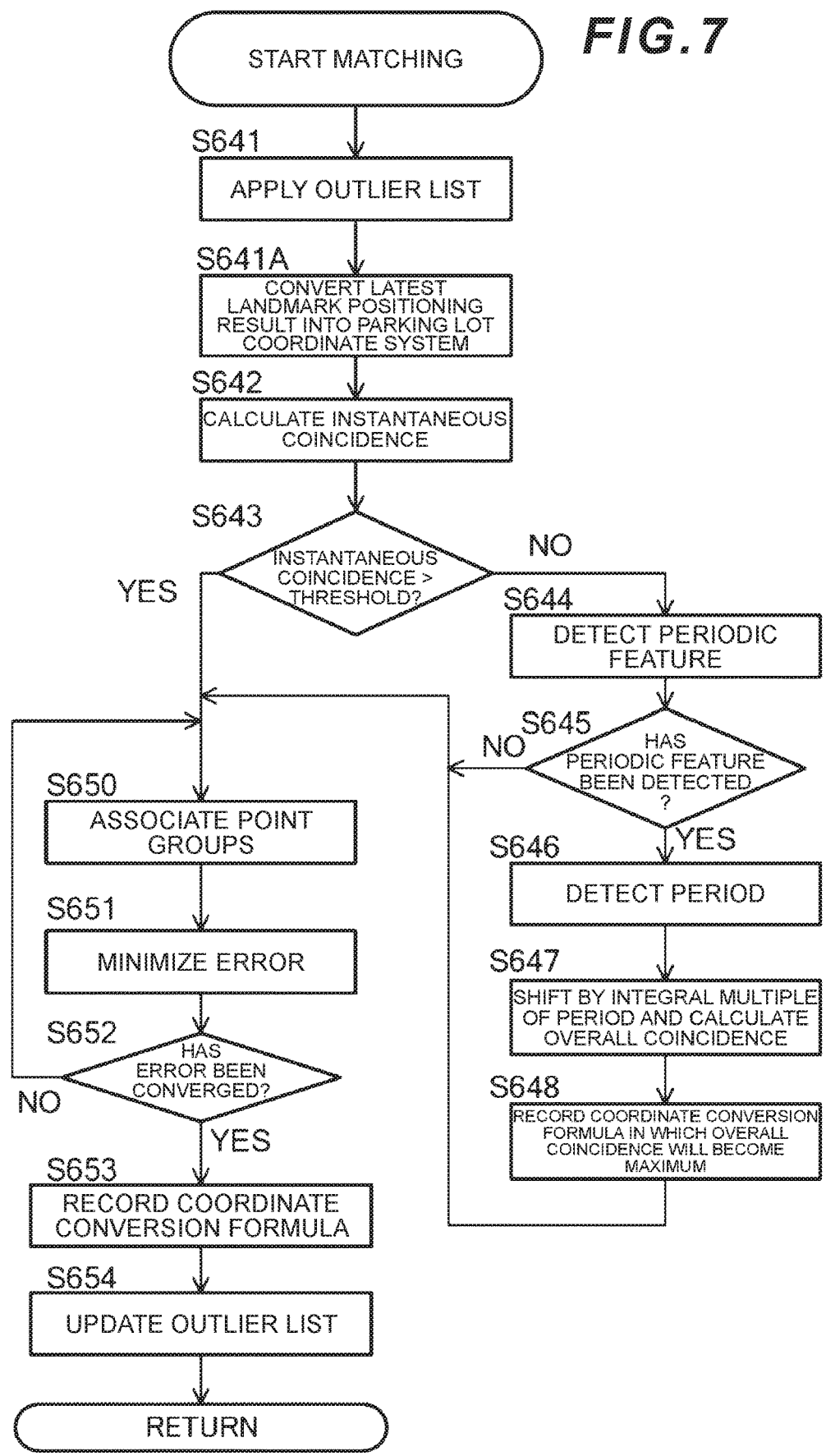
FIG. 7 is a flowchart showing the matching processing in the automatic parking phase.

When the execution of step S623 is completed, the computation unit 121 of the in-vehicle processing device 120 performs the matching processing shown in detail in FIG. 7 (step S624). In this matching processing, a correspondence relationship between the parking lot coordinate system and the local coordinate system, that is, a coordinate conversion formula between the parking lot coordinate system and the local coordinate system is obtained. In subsequent step S625, the computation unit 121 of the in-vehicle processing device 120 uses the coordinates of the vehicle 1 in the local coordinate system updated in step S622 and the coordinate conversion formula obtained in step S625 to calculate the coordinates of the vehicle 1 in the parking lot coordinate system, that is, the self-position. The computation unit 121 thereafter proceeds to step S626.

In step S626, the computation unit 121 of the in-vehicle processing device 120 executes a self-diagnosis for determining the reliability of the position calculated in step S625. Self-diagnosis is determined using, for example, the following three indexes.

In the first index, the amount of movement of the vehicle 1 estimated by a known dead reckoning technique using the outputs of the vehicle speed sensor 108 and the steering angle sensor 109 is compared with the amount of movement in a predetermined period estimated by the self-localization. When the difference is larger than a predetermined threshold, it is determined that the reliability is low.

In the second index, determination is made based on the error amount of the corresponding point calculated at the time of matching. When the error amount is larger than a predetermined threshold, it is determined that the reliability is low.

In the third index, it is determined whether there is a similar solution. When a similar solution is searched for, for example, by translating the width of the parking space from the obtained solution, if the number of corresponding point errors is within a certain number, the reliability is determined to be low. When it is not determined that the reliability is low in all three indicators, it is determined that the self-position has been estimated.

(Matching)

Details of the matching processing executed in step S624 of FIG. 6 are now explained with reference to FIG. 7.

In step S641, the computation unit 121 applies the outlier list 122A stored in the RAM 122 to the local peripheral information 122B, and temporarily excludes the points indicated in the outlier list 122A among the points included in the local peripheral information 122B from processing. The scope of application of the above is steps S642 to S653, and the point previously included in the outlier list 122A in step S654 is also targeted. However, since steps S641 to S643 cannot be executed when the flowchart shown in FIG. 7 is executed for the first time, the execution is started from step S650. The computation unit 121 thereafter proceeds to step S641A.

In step S641A, the coordinates of the point group detected from the latest captured image, that is, the coordinates of the point group configuring the landmark detected in step S621 in FIG. 6, are converted into the coordinates of the parking lot coordinate system. This conversion is realized by using the position in the local coordinate system of the vehicle 1 updated in step S622 and the coordinate conversion formula from the local coordinate system calculated in the previous time to the parking lot coordinate system.

In subsequent step S642, the instantaneous coincidence IC is calculated. The instantaneous coincidence IC is calculated based on Formula 1 below.

$$IC = DI_{in}/DI_{all} \quad \text{Formula 1}$$

However, in Formula 1, "DIin" is the number of points in which the distance to a point configuring the nearest parking lot point group 124C among the point groups detected from the latest captured image converted into the parking lot coordinate system in step S641A is equal to or less than a predetermined threshold. In Formula 1, "DIall" is the number of point groups detected in step S621. The computation unit 121 thereafter proceeds to step S643.

In step S643, the computation unit 121 determines whether the instantaneous coincidence IC calculated in step S642 is greater than the threshold. When it is determined that the instantaneous coincidence IC is greater than the threshold, the computation unit 121 proceeds to step S650. When it is determined that the instantaneous coincidence IC is equal to or less than the threshold, the computation unit 121 proceeds to step S644.

In step S644, the parking data as the target of the parking lot point group 124C, that is, a periodic feature, for example, a plurality of parking spaces arranged in a row, is detected from the point group data. As described above, since the point group included in the parking lot point group is obtained by extracting the edge of the image or the like, the parking space line can be detected from the points arranged at intervals corresponding to the thickness of the white line. In subsequent step S645, the computation unit 121 determines whether the periodic feature is detected in step S644. When it is determined that the periodic feature has been detected, the computation unit 121 proceeds to step S646. When it is determined that the periodic feature has not been detected, the computation unit 121 proceeds to step S650. In step S646, the computation unit 121 calculates a periodic feature period, for example, the width of the parking space. The width of the parking space here is an interval between the white lines configuring the parking space. The computation unit 121 thereafter proceeds to step S647.

In step S647, using the coordinate conversion formula calculated in the previous step S653 as a reference, the coordinate conversion formula is changed in a plurality of ways to calculate the overall coincidence IW. The coordinate conversion formula is changed in a plurality of ways so as to be shifted by an integral multiple of the periodic feature detected by the parking lot point group. The overall coincidence IW is calculated based on Formula 2 below.

$$IW = DWin/DWall \qquad \text{Formula 2}$$

However, in Formula 2, "DWin" is the number of points in which the distance to a point configuring the nearest parking lot point group 124C among the points, in which the points configuring the local peripheral information 122B were converted into the parking lot coordinate system by using the foregoing coordinate conversion formula, is equal to or less than a predetermined threshold. Moreover, in Formula 2, "DWall" is the number of points detected in step S621. The computation unit 121 thereafter proceeds to step S648. In step S648, the computation unit 121 stores the coordinate conversion formula that gives the maximum overall coincidence IW among the plurality of overall coincidences IW calculated in step S647 in the RAM 122, and then proceeds to step S650.

The association processing in step S650, the error minimization processing in step S651, and the convergence determination processing in step S625 can use an ICP (Iterative Closest Point) algorithm which is a known point group matching technique. However, the setting of the initial value in step S650 is specific to this embodiment and will be described in detail, but the rest will be described only briefly.

In step S650 which is executed when a positive determination is obtained in step S643, when a negative determination is obtained in step S645, when the execution of step S648 is completed, or when the determination in step S652 is negative, the association between the point group included in the parking lot data of the parking lot group point 124C and the point group included in the local peripheral information 122B is calculated. When executed after step S643 or step S648, used as the point group data of the local peripheral information 122B is a value obtained by coordinate conversion using a coordinate conversion formula recorded in the RAM 122. In other words, when a positive determination is obtained in step S643 and step S650 is executed, the coordinate conversion formula calculated in step S653 executed previously is used. On the other hand, when step S650 is executed after step S648, the coordinate conversion formula stored in step S648 is used. The computation unit 121 thereafter proceeds to step S651.

In step S651, the computation unit 121 changes the coordinate conversion formula so that the error of the corresponding point is minimized. For example, the coordinate conversion formula is changed so that the sum of the indices of the distances between the points associated in step S650 is minimized. The sum of the absolute values of the distances can be adopted as the sum of the distance indices between the associated points. In subsequent step S652, the computation unit 121 determines whether the error has converged. When it is determined that the error has converged, the computation unit 121 proceeds to step S653. When it is determined that the error has not converged, the computation unit 121 returns to step S650. In subsequent step S653, the computation unit 121 stores the coordinate conversion formula last changed in step S651 in the RAM 122, and then proceeds to step S654.

In step S654, the outlier list 122A is updated as follows. First, the existing outlier list 122A stored in the RAM 122 is cleared, that is, erased. Next, the point group of the local peripheral information 122B is converted into the parking lot coordinate system using the coordinate conversion formula recorded in step 653, and the distance from each point configuring the local peripheral information 122B to the point configuring the parking lot point group 124C corresponding to that point, that is, the Euclidean distance, is calculated. When the calculated distance is longer than a predetermined distance, the point of the local peripheral information 122B is added to the outlier list 122A. However, here, a further condition for adding the point of the local peripheral information 122B to the outlier list 122A may be that it is spatially located at the end. A spatial end is a point that is far from another point, such as a point that is acquired when recording is started. The outlier list 122A is updated by the foregoing processing. The flowchart of FIG. 7 is thereby ended.

(Automatic Parking)

Figure 8:
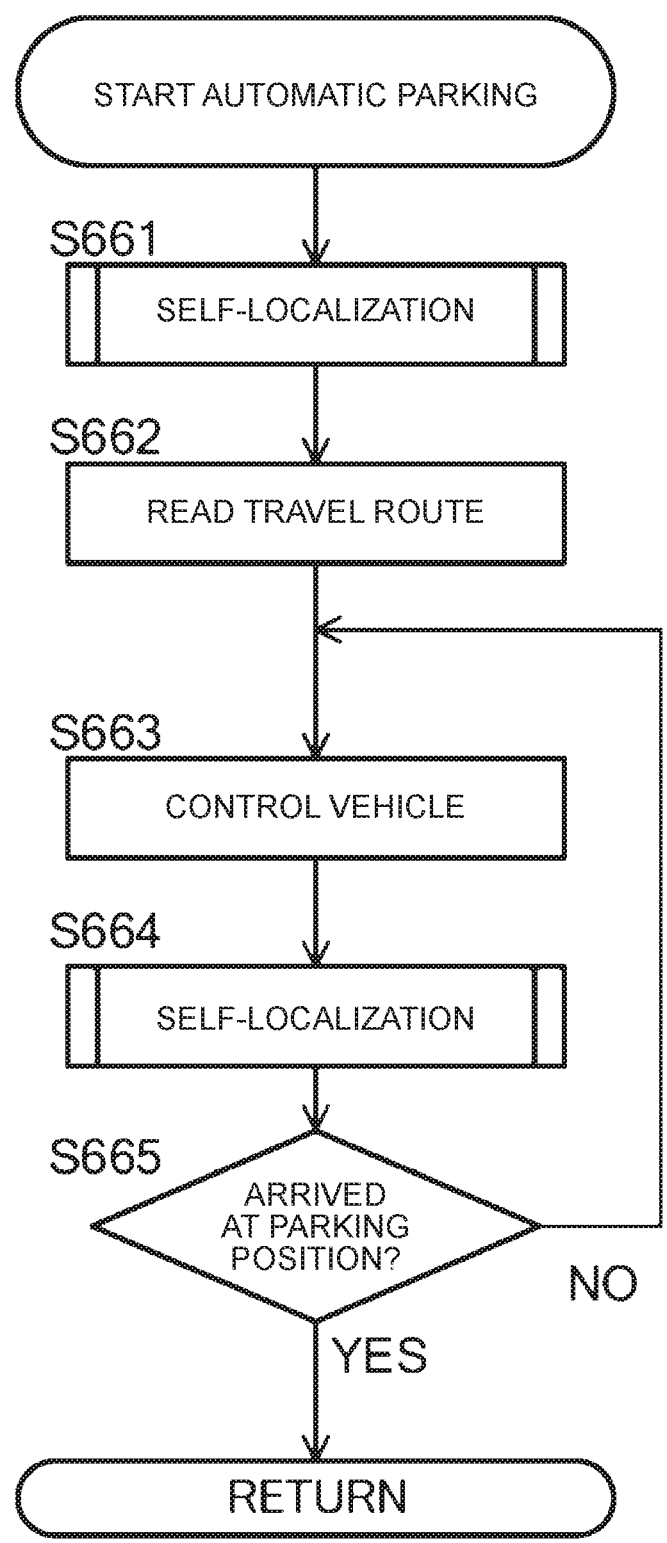
FIG. 8 is a flowchart showing the automatic parking processing in the automatic parking phase.

Details of the automatic parking processing executed in step S608 of FIG. 5 are now explained with reference to FIG. 8. The execution body of each step described below is the in-vehicle processing device 120. In step S661, the in-vehicle processing device 120 estimates the position of the vehicle 1 in the parking lot coordinate system. Because the processing in this step is the same as that in step S604 in FIG. 5, the explanation thereof is omitted. In subsequent step S662, the in-vehicle processing device 120 reads the travel route stored in the parking lot point group 124C, and then proceeds to step S663.

In step S663, the in-vehicle processing device 120 controls the steering unit 131, the driving unit 132, and the braking unit 133 via the vehicle control device 130, and moves the vehicle 1 to the parking position along the travel route read in step S662. However, the operation command may also be output to the driving unit 132 only when the automatic parking button 110C is continuously pressed by the user. In addition, when a person or a moving vehicle is extracted from the captured image of the camera 102, the in-vehicle processing device 120 operates the braking unit 133 to stop the vehicle 1. In subsequent step S664, the position of the vehicle 1 is estimated in the same manner as in step S661. In subsequent step S665, the in-vehicle processing device 120 determines whether parking is complete, that is, whether the vehicle 1 has reached the parking position. When it is determined that parking is not complete, the in-vehicle processing device 120 returns to step S663, and when it is determined that parking is complete, the in-vehicle processing device 120 ends the flowchart of FIG. 7.

(Operation Example of Recording Phase and Post-Processing Phase)

Figure 9:
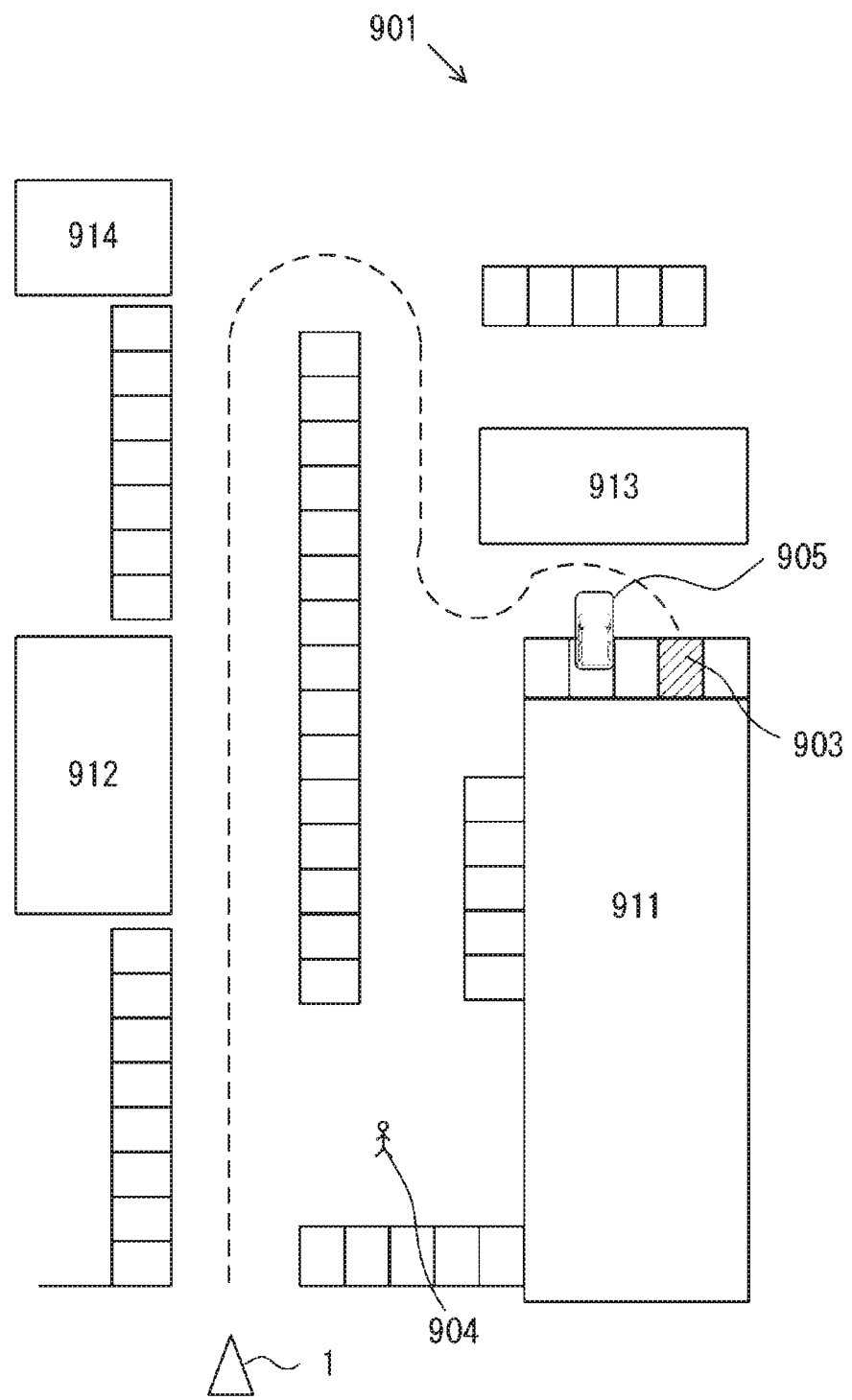
FIG. 9 is a schematic diagram of the parking lot 901.
Figure 10:
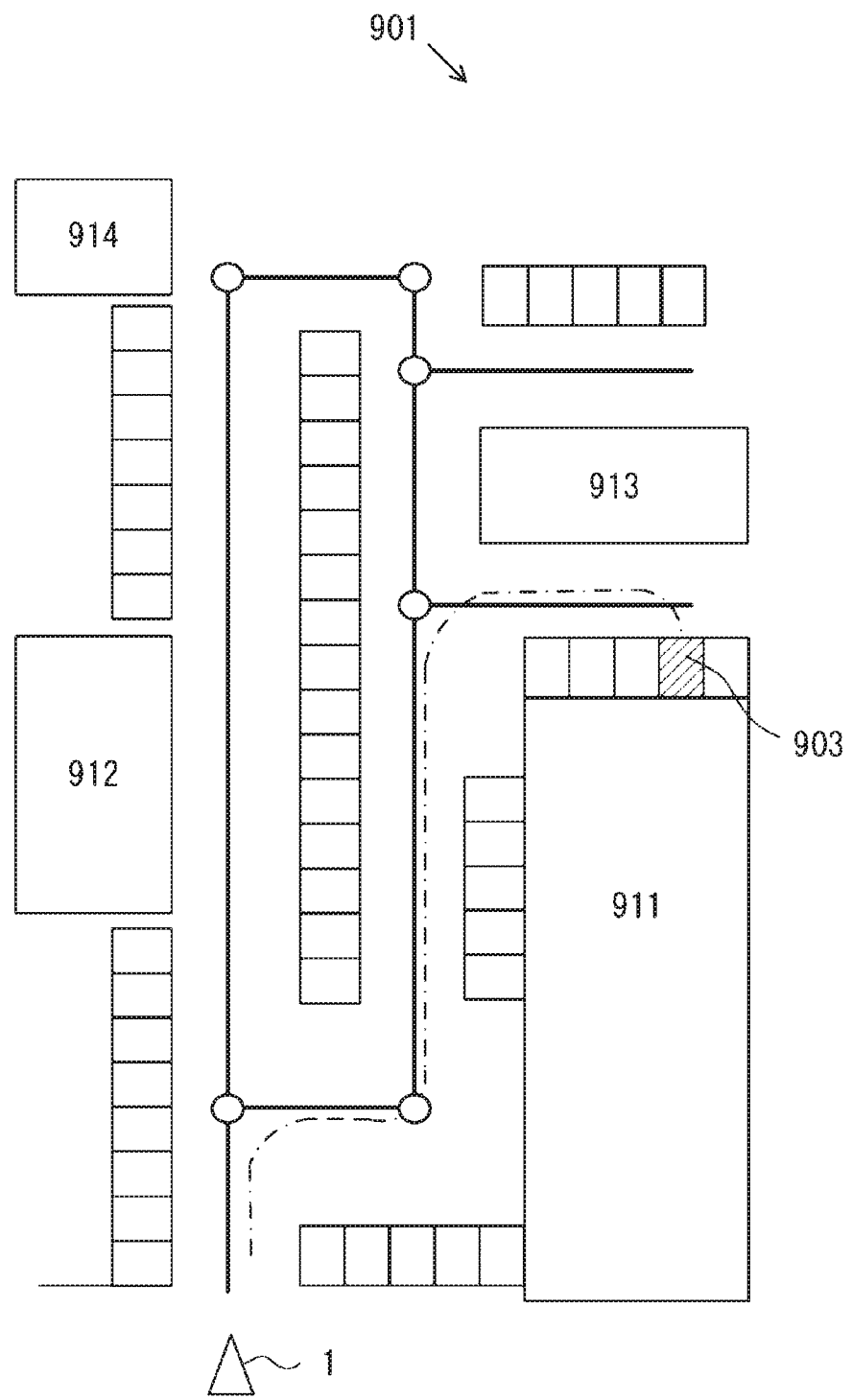
FIG. 10 is a diagram showing the links and the nodes of the parking lot 901.

An operation example of the recording phase and the post-processing phase is now explained with reference to FIG. 9 and FIG. 10. FIG. 9 and FIG. 10 are diagrams explaining an operation example of the recording phase and the post-processing phase. FIG. 9 is a schematic diagram of the parking lot 901, and there are buildings 911 to 914 and multiple parking spaces. The vehicle 1 will enter the parking lot 901 from the lower left part of the diagram and park at the parking position 903. The recording phase is started when the user presses the recording start button 110A when the vehicle 1 is at the position shown in FIG. 9. Here, there is a pedestrian 904 and a protruding vehicle 905 in the parking lot 901. The pedestrian 904 is walking at the illustrated position of the parking lot 901. The protruding vehicle 905 is a vehicle that is being parked far off from the parking space, and is not moving.

The user presses the recording start button 110A and then drives the vehicle 1 to the parking area 903. Soon after entering the parking lot 901, the user noticed the pedestrian 904 walking on the right side, and therefor went straight rather than making a right turn. The user thereafter made a right turn at 180 degrees near the building 914 at the upper part of the diagram, and then made a left turn after passing by the building 913. Here, because the user noticed the protruding vehicle 905, the user drove the vehicle 1 along the upper part of the diagram so as to avoid the protruding vehicle 905, and reached the parking position 903. Subsequently, the user pressed the recording complete button 110B, turned OFF the ignition switch, and completed the parking of the vehicle 1.

As described above, in the recording phase, the sensor information 124B and the vehicle movement information 124A are recorded. The sensor information 124B is, for example, the captured image obtained by the camera 102. The vehicle movement information 124A is, for example, the vehicle speed and the steering angle of the vehicle 1. For example, when the sensor information 124B and the vehicle movement information 124A are recorded every predetermined processing period, it is not necessary to record the time information, but when the sensor information 124B and the vehicle movement information 124A are not recorded every predetermined processing period, the time information is also recorded. Note that the time information may be, for example, the elapsed time from the timing that the recording start button 110A was pressed as the origin, or zero seconds, or may also be the Japan Standard Time or the World Standard Time.

In the post-processing phase in which the processing flow is shown in FIG. 4, foremost, the initialization processing (S511) is performed, and steps S512 to S514 are repeated in the number of sensor information and vehicle movement information that have been recorded. However, in the landmark positioning (512), vehicles and humans are excluded from the measurement result based on template matching, and moving objects that are moving are also excluded from the measurement result. Thus, while the protruding vehicle 905 is not moving, it is determined as a "vehicle" based on template matching and excluded, and the pedestrian 904 is excluded based on the two reasons that it is a moving object and a human. In other words, in the landmark positioning, the pedestrian 904 and the protruding vehicle 905 are treated as not existing.

Subsequently, as shown with the bold lines and white circles in FIG. 10, the links and the nodes are created (S516), and the links and the nodes to become the shortest route are calculated as shown with a dashed line (S517). Note that, in FIG. 10, a dashed line is indicated next to the links and the nodes that will result in the shortest route. Subsequently, the coordinates of the center of the road width of the links to become the shortest route are calculated as the travel route (S518), and the coordinates of the landmark, the travel route, and the parking area are recorded as the new parking lot point group 124C (519).

(Operation Example—Execution Phase)

An operation example of the matching processing in the execution phase is now explained with reference to FIG. 11 to FIG. 13. In this operation example, the point group data corresponding to the entire parking lot 901 shown in FIG. 9 is stored in advance in the parking lot point group 124C.

Figure 11:
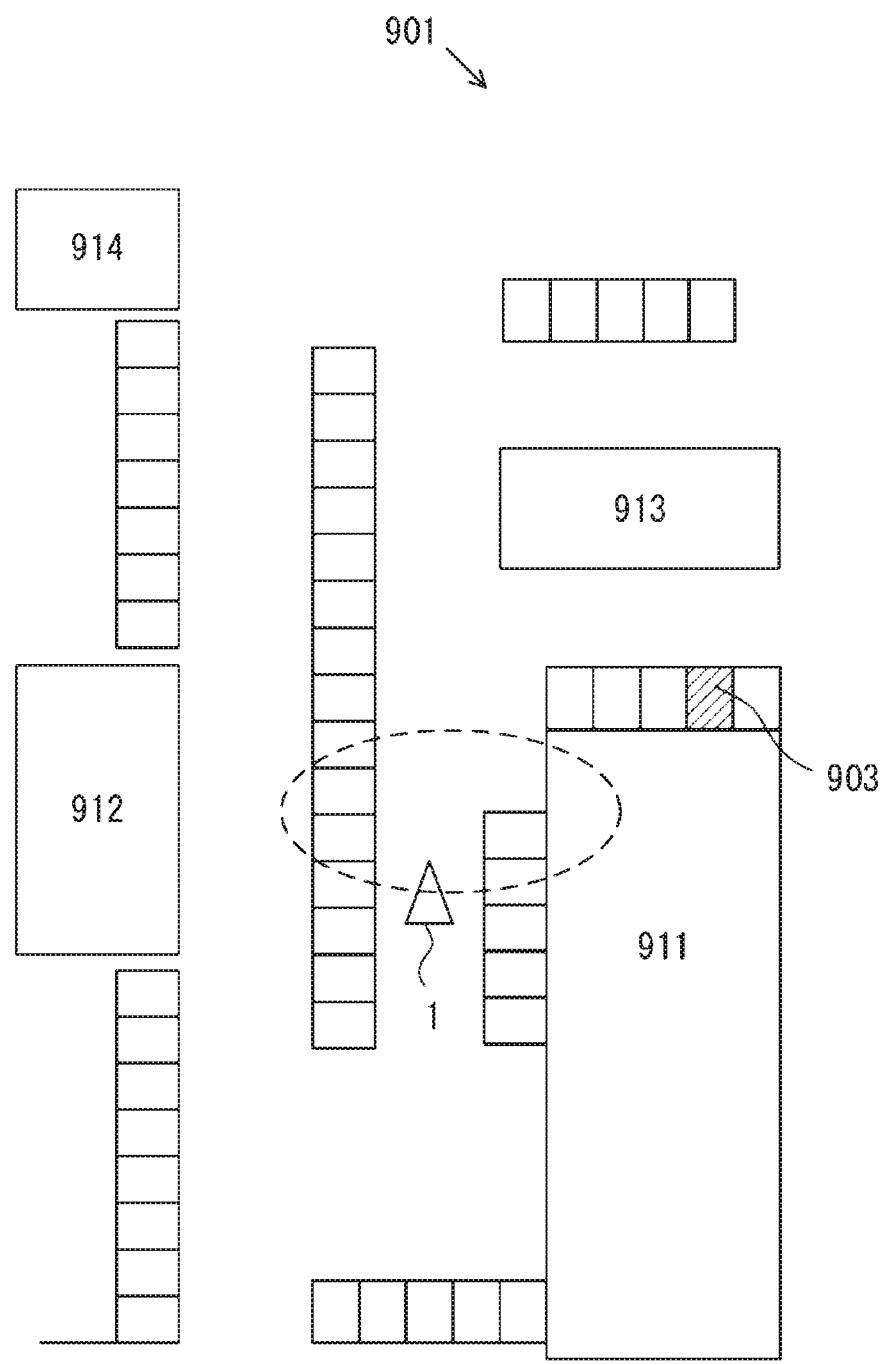
FIG. 11 is a diagram showing the current position of the vehicle 1 in the parking lot 901.
Figure 12A:
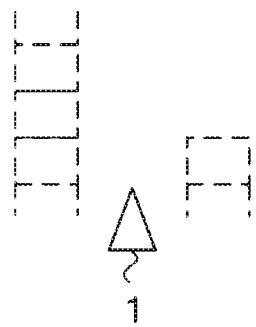
FIG. 12A is a diagram showing the data in which the point group extracted from the image of the vehicle 1 captured at the position shown in FIG. 11 has been converted into parking lot coordinates.
Figure 12B:
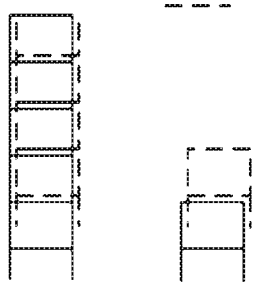
FIG. 12B is a diagram showing the comparison of the parking lot point group 124C and the local peripheral information 122B shown in FIG. 12A when the estimation of the position of the vehicle 1 in the parking lot coordinate system contains an error.

FIG. 11 is a diagram showing the current position of the vehicle 1 in the parking lot 901. The vehicle 1 is facing upward in FIG. 11. FIG. 12A and FIG. 12B show parking space lines encompassed by the broken-line circle in FIG. 11 which is a front area of the vehicle 1.

FIG. 12A is a diagram showing data obtained by converting a point group extracted from an image taken with the vehicle 1 at the position shown in FIG. 11 into parking lot coordinates. In other words, the point group shown in FIG. 12A is the point group detected from the latest captured image in the local peripheral information 122B, and is the data processed in step S641A of FIG. 7. However, in FIG. 12A, it is represented as a broken line rather than as a point. In FIG. 12A, the vehicle 1 is also displayed for comparison with FIG. 11. As shown in FIG. 12A, the point group data of the parking space line is present continuously on the left side of the vehicle 1, and the point group data of the parking space line is present only at the front side on the right side of the vehicle 1.

FIG. 12B is a diagram showing a comparison between the parking lot point group 124C and the local peripheral information 122B shown in FIG. 12A when the position estimation of the vehicle 1 in the parking lot coordinate system contains an error. In FIG. 12B, since the previous position estimation has deviated by approximately one of the widths of the parking space, the local peripheral information 122B existing on the right side of the vehicle 1 has deviated from the parking lot point group 124C. When the instantaneous coincidence IC is calculated in such a state (step S642 in FIG. 7), the instantaneous coincidence IC becomes a low value due to the foregoing deviation on the right side of the vehicle 1. When it is determined that this value is lower than the threshold (step S643: NO), the parking space is detected as a periodic feature (steps S644, S645: YES), the width of the parking space is calculated from the parking lot point group 124C (step S646), and the overall coincidence IW is calculated by moving the parking space by an integral multiple of the width (step S647).

Figure 13A:
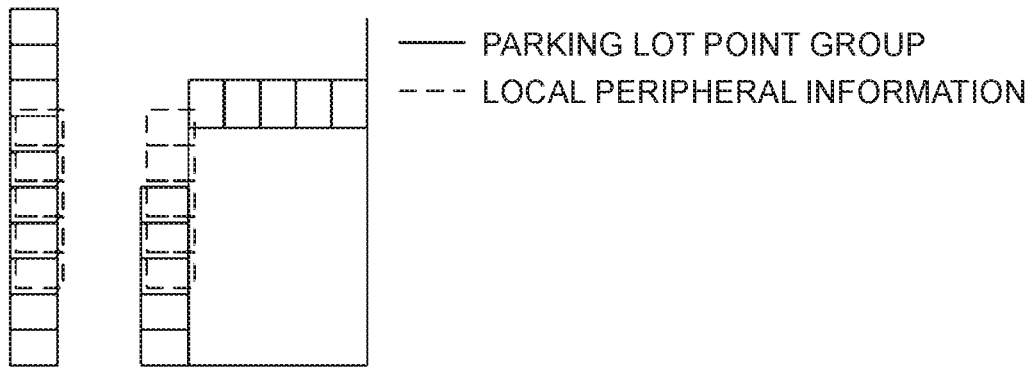
FIG. 13A to FIG. 13C are diagrams showing the relationship with the parking lot point group 124C when the local peripheral information 122B shown in FIG. 12B is moved by an integral multiple of the width of the parking space.
Figure 13B:
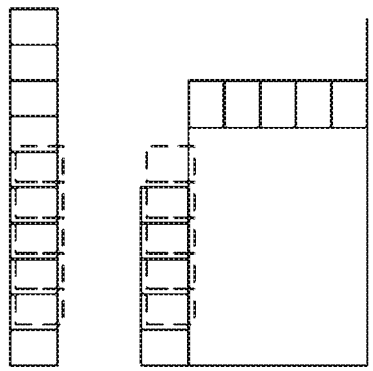
Figure 13C:
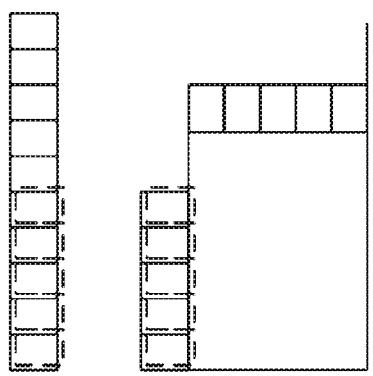

FIG. 13A to FIG. 13C are diagrams showing the relationship with the parking lot point group 124C when the local peripheral information 122B shown in FIG. 12B is moved by an integral multiple of the width of the parking space. In FIG. 13A to FIG. 13C, the local peripheral information 122B shown in FIG. 12B has moved upward in the drawing by +1, 0, and −1 times the width of the parking space. In FIG. 13A, the local peripheral information 122B has moved by one of the widths of the parking space to the upper side in the drawing, and the deviation between the local peripheral information 122B and the parking lot point group 124C has increased. Consequently, the overall coincidence IW in FIG. 13A is smaller than that in the case of the local peripheral information 122B not moving. In FIG. 13B, the local peripheral information 122B does not move, and the local peripheral information 122B and the parking lot point group 124C have deviated by one of the widths of the parking space as seen in FIG. 12B. In FIG. 13 (c), the local periphery information 122B has moved to the bottom of the drawing by one of the widths of the parking space, and the local periphery information 122B substantially coincides with the parking lot point group 124C. Consequently, the overall coincidence IW in FIG. 13C is larger than that in the case of the local periphery information 122B not moving.

Since the amount of movement of the local peripheral information 122B and the increase/decrease in the overall coincidence IW have the relationship described above, in the example shown in FIG. 13, it is determined that the overall coincidence IW corresponding to FIG. 13C is maximum, and the coordinate conversion formula corresponding to this movement is stored in the RAM 122 (step S648). The in-vehicle processing device 120 can thereby improve the estimated position accuracy.

According to the first embodiment described above, the following effects are obtained.

(1) An in-vehicle processing device 120 comprises an interface 125 which operates as a sensor input unit which acquires sensor information 124B as an output of a sensor, or a camera 102, which acquires information around a vehicle 1, an interface 125 which operates as a movement information acquisition unit which acquires vehicle movement information 124A, or vehicle speed sensor 108 and steering angle sensor 109, as information related to a movement of the vehicle 1, a log recording unit 121C which records the vehicle movement information 124A and the sensor information 124B in a storage unit 124, a map generation unit 121D which creates an environmental map including a drivable area where the vehicle 1 can travel based on determination of static objects that do not move and mobile objects that can move by using the vehicle movement information 124A and the sensor information 124B recorded in the storage unit 124, and a route calculation unit 121E which calculates a travel route of the vehicle 1 by using the environmental map, wherein the environmental map includes information of a parking position 903 as a position of parking the vehicle 1. Because the in-vehicle processing device 120 can perform computation by using the recorded vehicle movement information 124A and sensor information 124B, there is no need to complete the processing in real time, and calculation of the optimal travel route can be realized with an inexpensive computation device.

Note that it is also possible to record the route that the vehicle 1 travelled on in the recording phase as the travel route in the parking lot point group 124C, and with this method the calculation amount can be reduced even more than in this embodiment. However, in the foregoing case, the route will continue to include problems such as the influence of mobile objects and the user's driving skills in the recording phase. Specifically, there is a problem in that the route that was changed for avoiding mobile objects temporarily existing upon execution of the recording phase or the route that required numerous quick turns because the user's driving skills are lacking will be reproduced as is also in the automatic parking phase. Nevertheless, according to this embodiment, because the travel route is calculated once again via offline processing, the foregoing problem will not arise.

(2) Recording by the log recording unit 121C is ended when parking of the vehicle 1 is completed. The map generation unit 121D and the route calculation unit 121E start their operation after parking of the vehicle 1 is completed. Because there is no need to perform other processing during a commeasurable period from the completion of parking to the subsequent departure, considerable resources can be used for creating the environmental map and calculating the travel route.

(3) In this embodiment, vehicle movement information including the steering information of the vehicle 1 and the speed information of the vehicle 1 is recorded as is. Thus, the processing load in the recording phase is light, and processing can be realized with an inexpensive device.

(4) The route calculation unit 121E calculates the center in a width direction of the drivable area as the travel route. Thus, it is possible to calculate the optimal travel route by ignoring mobile objects recorded in the recording phase, such as the protruding vehicle 905 of FIG. 9.

(5) The in-vehicle processing device 120 comprises a map generation unit 121D and a route calculation unit 121E as calculation result recording units that record the environmental map and the travel route in the storage unit, and an automatic processing unit 121F as a control unit which controls the vehicle 1 by using the environmental map and the travel route. Thus, the in-vehicle processing device 120 can move the vehicle 1 along the calculated optimal travel route.

(6) The automatic processing unit 121F moves the vehicle 1 to the parking position by using the environmental map and the travel route. Thus, even in an environment in which high-precision map information has not been created by a third party, after the user manually parks one's vehicle once, the vehicle can thereafter be automatically parked.

Modified Example 1

In the first embodiment explained above, the vehicle movement information 124A was recorded as is in the recording phase. Nevertheless, instead of recording the vehicle movement information 124A as is, information based on the vehicle movement information, that is, the position and orientation of the vehicle 1 in the local coordinate system, may also be recorded.

Figure 14:
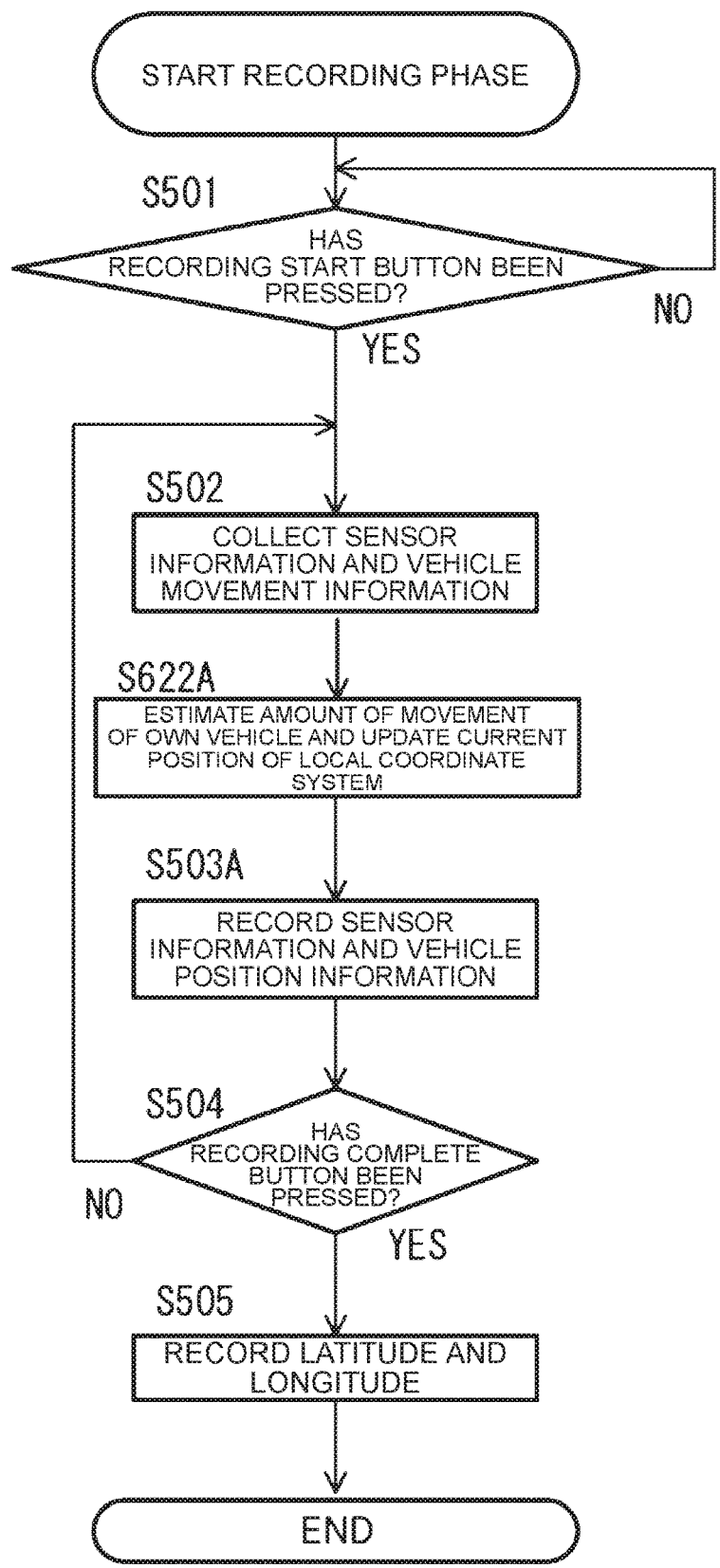
FIG. 14 is a flowchart showing the processing in the recording phase of modified example 1.

FIG. 14 is a flowchart showing the processing in the recording phase of modified example 1. In FIG. 14, subsequent to step S502 in FIG. 3 of the first embodiment, the in-vehicle processing device 120 performs step S622A, that is, the processing corresponding to step S622 of FIG. 6. Specifically, the in-vehicle processing device 120 uses the vehicle movement information acquired in step S502 and updates the position and orientation of the vehicle 1 in the local coordinate system. In subsequent step S503A, the in-vehicle processing device 120 records the sensor information acquired in step S502, and the position and orientation of the vehicle 1 calculated in step S622A.

According to foregoing modified example 1, the following effects are obtained.

(7) Information based on the vehicle movement information is information using the coordinates in the parking lot coordinate system based on the parking position of the vehicle. Thus, processing in the post-processing phase can be reduced.

Modified Example 2

In the first embodiment explained above, both the recording phase and the automatic driving phase were parking scenes of moving the vehicle 1 to the parking area. Nevertheless, the in-vehicle processing device 120 may additionally comprise an automatic departure phase that may apply the automatic driving phase to a departure scene of the vehicle 1. Moreover, in the foregoing case, the in-vehicle processing device 120 does not need to comprise the automatic parking phase.

Figure 15:
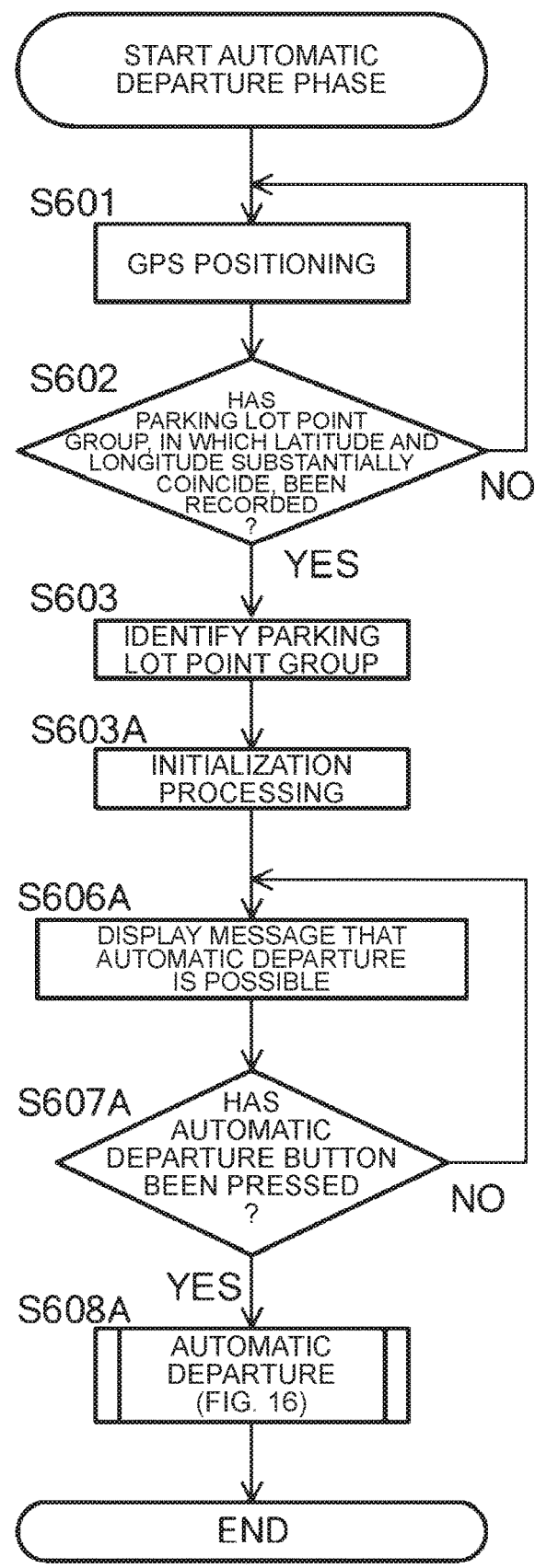
FIG. 15 is a flowchart showing the overall processing in the automatic departure phase.
Figure 16:
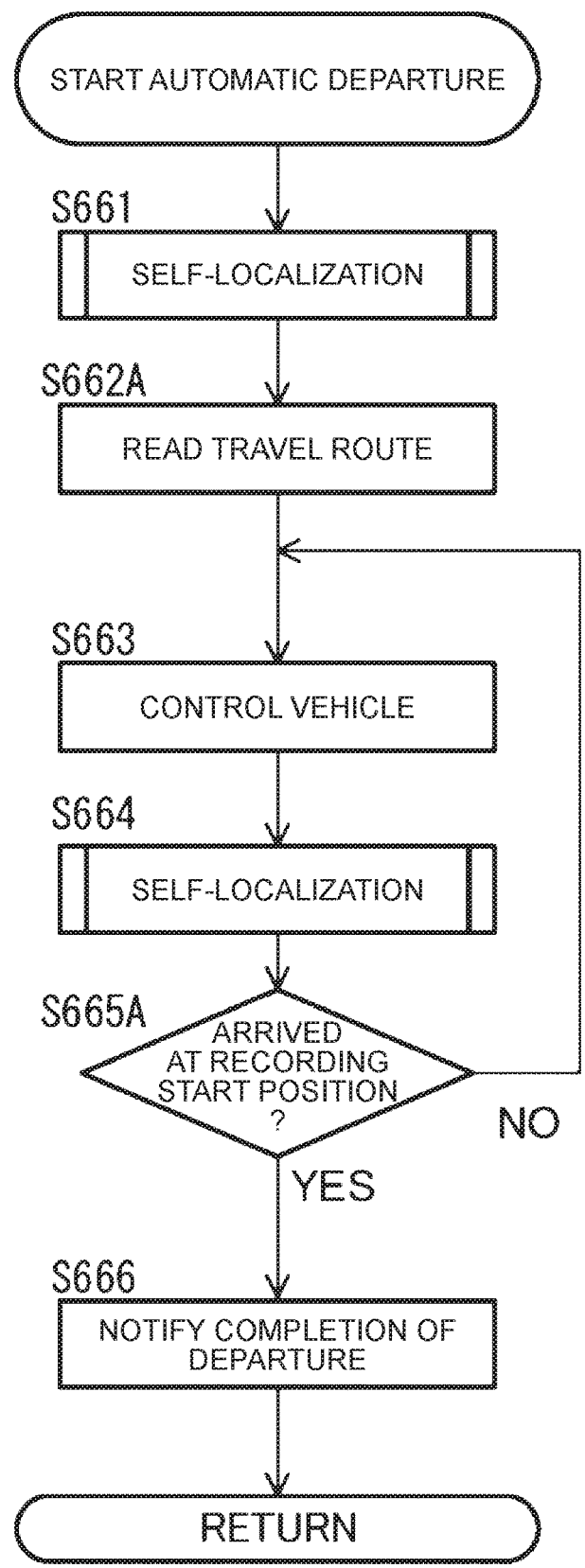
FIG. 16 is a flowchart explaining the automatic departure processing.

FIG. 15 and FIG. 16 are diagrams explaining the processing in the automatic departure phase of the in-vehicle processing device 120. FIG. 15 is a flowchart showing the overall processing of the automatic departure phase. However, in FIG. 15, the same step number is given to the same processing as the automatic parking phase shown in FIG. 5, and a similar step number is given to similar processing.

The automatic departure phase is always executed when the ignition switch is turned ON, or executed when the ignition switch is turned ON and the user presses a predetermined switch. In the automatic departure phase, foremost, step S601 to step S603A are executed in the same manner as the automatic parking phase, and the in-vehicle processing device 120 thereafter proceeds to step S606A. Note that, in the automatic parking phase explained in the first embodiment, because the position of the vehicle 1 when the automatic parking phase is started is not necessarily constant, the self-localization in step S604 was required. Nevertheless, in the automatic departure phase, because the vehicle 1 is parked in the parking area, self-localization is not required.

In step S606A, the in-vehicle processing device 120 displays a message on the display device 111 to the effect that automatic departure is possible, and in subsequent step S607A, determines whether the automatic departure button has been pressed by the user. When it is determined that the automatic departure button has been pressed, the in-vehicle processing device 120 proceeds to step S608A to execute the automatic departure processing according to the routine shown in FIG. 16, and when it is determined that the automatic departure button has not been pressed, the in-vehicle processing device 120 returns to step S606A. This concludes the explanation of FIG. 15.

FIG. 16 is a flowchart explaining the automatic departure processing. However, in FIG. 16, the same step number is given to the same processing as the automatic parking processing shown in FIG. 8, and a similar step number is given to similar processing. The differences between FIG. 8 and FIG. 16 are that step S662 (in FIG. 8) has been changed to step S662A, step S665 has been changed to step S665A, and step S666 has been added at the end. In the following explanation, only these changes will be explained.

In step S662A, the in-vehicle processing device 120 reads the travel routes stored in the parking lot point group 124C in order from the bottom, and then proceeds to step S663. In step S665A, the in-vehicle processing device 120 determines whether the vehicle 1 has reached the recording start position, that is, the coordinates indicated at the top of the travel route. The in-vehicle processing device 120 proceeds to step S666 upon determining that the vehicle 1 has reached the top coordinates, and returns to step S663 upon determining that the vehicle 1 has not reached the top coordinates. In step S666, the in-vehicle processing device 120 displays a message on the display device 111 to the effect that departure of the vehicle 1 is complete, and then ends the processing shown in FIG. 16.

According to foregoing modified example 2, the following effects are obtained.

(8) The automatic processing unit 121F moves the vehicle 1, which is parked at the parking position, along the travel route by using the environmental map and the travel route. Thus, even in an environment in which high-precision map information has not been created by a third party, after the user manually parks one's vehicle once, the vehicle can thereafter be automatically departed.

Modified Example 3

The parking lot point group 124C may also be edited by the user. Any one among the parking area, travel route, and landmark included in the parking lot point group 124C may be edited by the user. The parking lot point group 124C may be edited by the user using the input device 110 while viewing the information displayed on the display device 111. Moreover, the in-vehicle processing device 120 may comprise a reader/writer of a general-purpose storage device, for example, so that the parking lot point group 124C stored in the storage unit 124 can be exported and imported via a USB memory.

When the parking lot point group 124C can be exported and imported, the user can edit the parking lot point group 124C, for example, by using a personal computer. The editing of the parking lot point group 124C may be realized with dedicated software installed in a dedicated interface, and, when the parking lot point group 124C is configured only with text information, the parking lot point group 124C may be edited with a general-purpose text editor. The dedicated software, for example, may graphically display the travel route, and enable the simple editing of the travel route based on a drag-and-drop operation using a mouse. In the foregoing case, by also displaying the landmarks, the user will be able to visually confirm the spacing between the obstacle and the travel route.

Modified Example 4

The respective landmarks included in the parking lot point group 124C may also contain reliability information. The reliability can be calculated, for example, by using information of the buildings stored in a navigation device (not shown) mounted on the vehicle 1.

In the post-processing phase, the in-vehicle processing device 120 reads, from a navigation device not shown, information of buildings located near the latitude and longitude of the parking lot. Subsequently, when the in-vehicle processing device 120 identifies the correspondence of the plurality of landmarks that were obtained, that is, the shape of the point group, and the position and shape of the buildings, and determines that any of the point groups is a building, the in-vehicle processing device 120 sets the reliability of that point group to be higher. This is because, if it is a building, then the frequency of its position and shape changing is considered to be extremely low.

The in-vehicle processing device 120 uses the reliability set in the landmarks in the self-localization processing. Specifically, in the matching of the parking lot point group and the local peripheral information, the in-vehicle processing device 120 performs weighing to the respective landmarks configuring the parking lot point group based on their reliability. More specifically, the in-vehicle processing device 120 sets the weight to be higher as the reliability is higher. According to foregoing modified example 2, the accuracy of matching in the self-localization can be improved by using the information of buildings stored in the navigation device.

Modified Example 5

A laser scanner or LiDaR (Light Detection and Ranging) may be used in substitute for the camera 102, or a plurality of sensors may be used in combination.

Modified Example 6

When the ignition switch is turned OFF without the recording complete button 110B being pressed in the recording phase, the in-vehicle processing device 120 may determine that the pressing of the recording complete button 110B was included in the OFF operation of the ignition switch.

Modified Example 7

The in-vehicle processing device 120 may omit the exclusion using an outlier list, and omit the improvement of matching using a periodic feature. In the foregoing case, the processing shown in FIG. 7 will only be steps S650 to S653.

Modified Example 8

At least one of either the communication device 114 or the vehicle control device 130 may be included in the in-vehicle processing device 120.

Second Embodiment

The second embodiment of the in-vehicle processing device according to the present invention is now explained. In the following explanation, the same components as those in the first embodiment are denoted by the same reference numerals, and different points will be mainly explained. Points that are not particularly explained are the same as those in the first embodiment. This embodiment is different from the first embodiment mainly in that the recording phase is executed upon the departure of the vehicle. Note that the automatic driving phase being executed upon the parking of the vehicle is the same as the first embodiment.

(User's Operation)

The user's operation that is unique to this embodiment is as follows. In this embodiment, the user boards the vehicle 1 parked in the parking area, and presses the recording start button 110A before starting the vehicle 1. The in-vehicle processing device 120 thereby starts the processing of the recording phase. Subsequently, the user personally drives the vehicle 1 and departs from the parking lot, and then presses the recording complete button 110B.

(Configuration)

The configuration of the in-vehicle processing device 120 in this embodiment is the same as the first embodiment excluding the points explained below. The in-vehicle processing device 120 starts the processing of the recording phase when the user presses the recording start button 110A while the vehicle 1 is parked, and ends the processing of the recording phase when the user subsequently presses the recording complete button 110B. The in-vehicle processing device 120 starts the processing of the post-processing phase immediately after the recording phase is ended, or when the load of the CPU configuring the in-vehicle processing device 120 becomes a predetermined threshold or lower after the recording phase is ended. However, the in-vehicle processing device 120 may also suspend the post-processing phase when the CPU configuring the in-vehicle processing device 120 exceeds a predetermined threshold during the processing of the post-processing phase.

Note that, in this embodiment, the position of the vehicle 1 upon starting the recording phase is recorded in the parking area of the vehicle movement information 124A.

According to the second embodiment explained above, the following effects are obtained.

(9) Recording by the log recording unit 121C is started from departure of the vehicle 1 from the parking position. Thus, the environmental map and the travel route around the parking area can be created by using the opportunity of the departure of the vehicle 1.

Modified Example 1 of Second Embodiment

The post-processing phase may also be started when the ignition switch of the vehicle 1 is turned OFF in the same manner as the first embodiment.

Modified Example 2 of Second Embodiment

In the recording phase, the in-vehicle processing device 120 may also determine the lapse of a given period of time or the recorded information reaching a predetermined data volume to be equivalent to the recording complete button 110B being pressed. According to this modified example, even when the user forgets to press the recording complete button 110B, it is possible to prevent the bloating of the vehicle movement information 124A and the sensor information 124B.

Modified Example 3 of Second Embodiment

In the second embodiment also, the in-vehicle processing device 120 may additionally comprise the automatic departure phase in the same manner as modified example 2 of the first embodiment. In the foregoing case, the in-vehicle processing device 120 does not need to comprise the automatic parking phase.

Third Embodiment

The third embodiment of the in-vehicle processing device according to the present invention is now explained with reference to FIG. 17 and FIG. 18. In the following explanation, the same components as those in the first embodiment are denoted by the same reference numerals, and different points will be mainly explained. Points that are not particularly explained are the same as those in the first embodiment. This embodiment is different from the first embodiment mainly in that the post-processing phase is executed outside the vehicle.

Configuration

Figure 17:
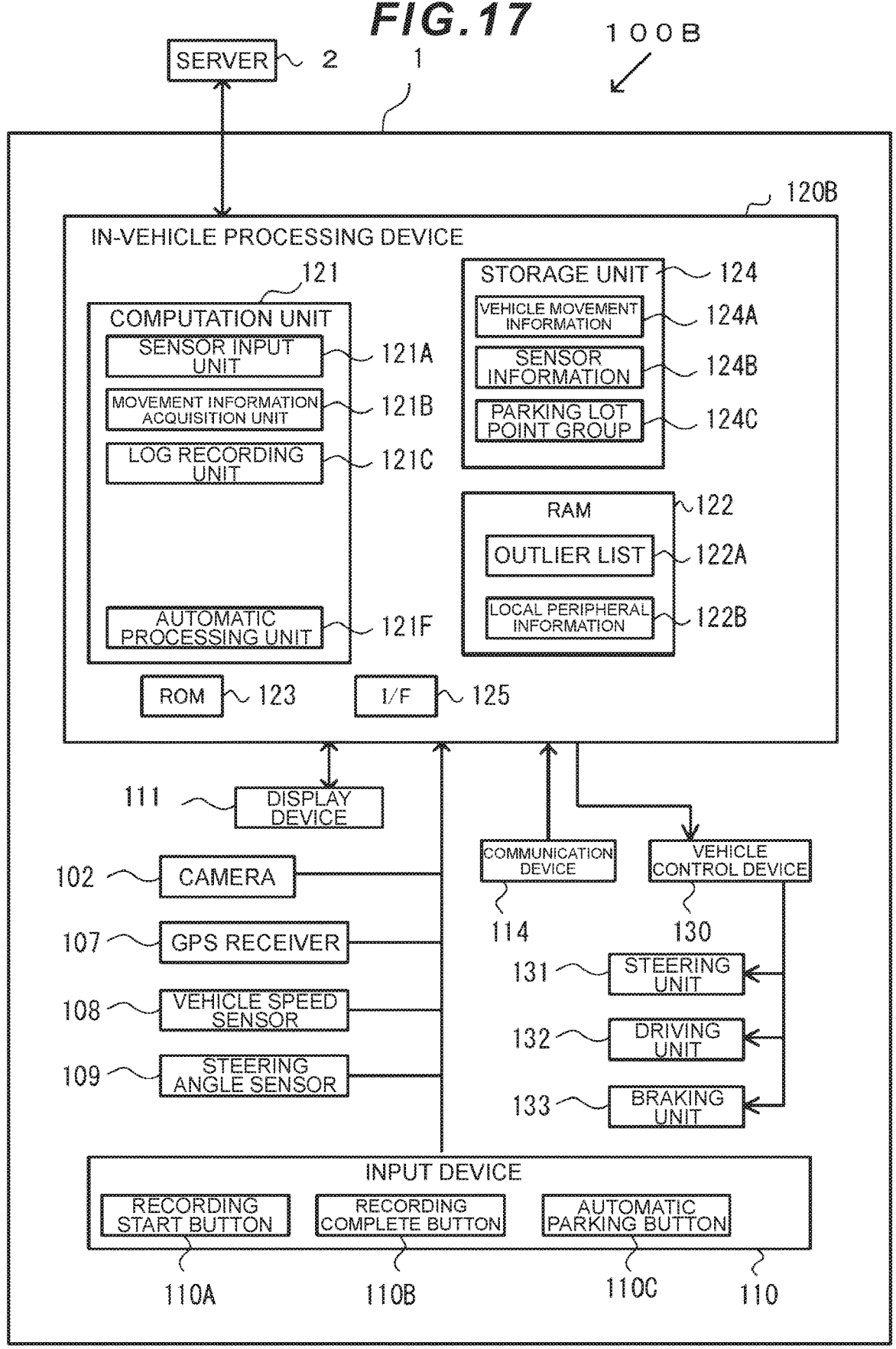
FIG. 17 is a diagram showing the movement support system 100B in the third embodiment.

FIG. 17 is a diagram showing a movement support system 100B in the third embodiment. However, for the sake of convenience in preparing the drawings, the configuration of the server 2 is separately illustrated in FIG. 18. The movement support system 100B includes an in-vehicle processing device 120B and a server 2. The hardware configuration mounted on the vehicle 1 is the same as the first embodiment. However, the in-vehicle processing device 120B does not comprises the map generation unit 121D and the route calculation unit 121E in comparison to the first embodiment.

Figure 18:
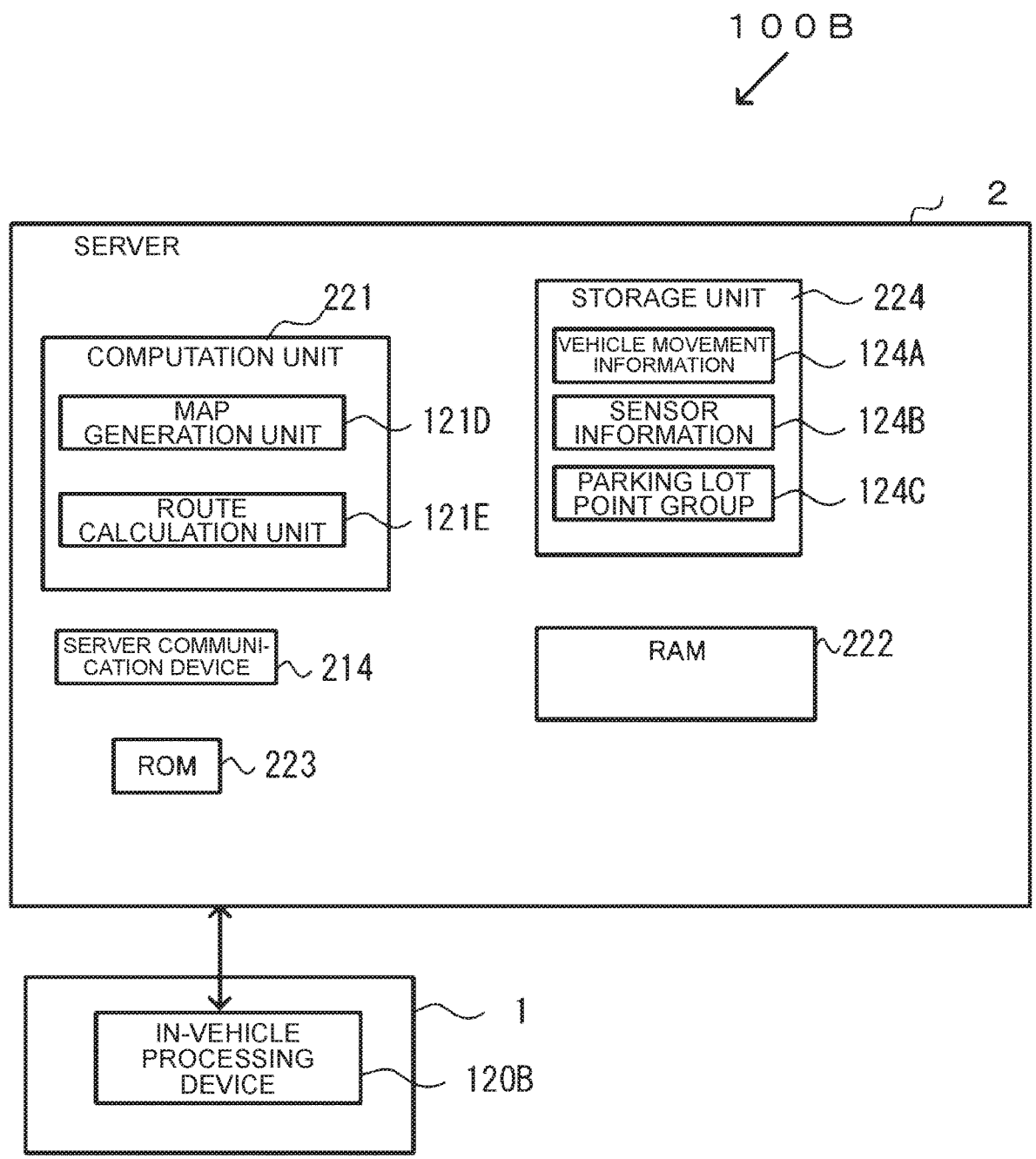
FIG. 18 is a diagram showing the configuration of the server 2.

FIG. 18 is a diagram showing the configuration of the server 2. The server 2 comprises a computation unit 221, a RAM 222, a ROM 223, a storage unit 224, and a server communication device 214. The computation unit 221 is a CPU. The RAM 222 is a readable/writable storage area and operates as a main storage device of the server 2. The ROM 223 is a read-only dedicated storage area, and stores the programs described later. The programs are expanded in the RAM 222 and executed by the computation unit 221. The computation unit 221 operates as the map generation unit 121D and the route calculation unit 121E by reading and executing the programs.

The storage unit 224 is a non-volatile storage area and stores vehicle movement information 124A, sensor information 124B and a parking lot point group 124C. The vehicle movement information 124A and the sensor information 124B are received from the in-vehicle processing device 120B. The parking lot point group 124C is generated based on the map generation unit 121D and the route calculation unit 121E. Because the operation of the map generation unit 121D and the route calculation unit 121E is the same as the first embodiment, the explanation thereof is omitted.

(Operation)

At the end of the recording phase, the in-vehicle processing device 120B sends the vehicle movement information 124A and the sensor information 124B to the server 2. More specifically, subsequent to step S505 as the final processing shown in FIG. 3, the in-vehicle processing device 120B uses the communication device 114 and sends the vehicle movement information 124A and the sensor information 124B to the server 2. Because the sending of the vehicle movement information 124A and the sensor information 124B from the in-vehicle processing device 120B to the communication device 114 is performed via the interface 125, in this embodiment, it could be said that the interface 125 functions as an "in-vehicle communication unit" that sends the vehicle movement information 124A and the sensor information 124B to the server 2.

The in-vehicle processing device 120B uses the communication device 114 and, for example, receives information of the parking lot point group 124C from the server 2 as follows. When the ignition switch is turned ON, the in-vehicle processing device 120B makes an inquiry to the server 2, and receives the parking lot point group 124C which has not yet been received. Moreover, the in-vehicle processing device 120B may also be configured so that it can receive the parking lot point group 124C from the server 2 even during the period that the ignition switch is being turned OFF.

In this embodiment, it could be said that the communication device 114 of the in-vehicle processing device 120B functions as an "in-vehicle communication unit" which sends the vehicle movement information 124A and the sensor information 124B to the server 2, and receives the parking lot point group 124C from the server 2.

When the server 2 receives the vehicle movement information 124A and the sensor information 124B from the in-vehicle processing device 120B, the server 2 performs the processing of the post-processing phase shown in FIG. 4, and uses the server communication device 214 and sends the recorded parking lot point group 124C to the in-vehicle processing device 120B. In other words, it could be said that the server communication device 214 functions as a "server communication unit" which sends the parking lot point group 124C. The server 2 may start the processing of the post-processing phase immediately after receiving the vehicle movement information 124A and the sensor information 124B, or start the processing when the processing load of the server 2 falls below a predetermined threshold, or perform batch processing for each predetermined length of time.

According to the third embodiment described above, the following effects can be obtained in addition to the effects of the first embodiment.

(10) A movement support system 100B includes an in-vehicle processing device mounted on a vehicle 1, and a server 2 that is not mounted on the vehicle. The in-vehicle processing device 120B comprises an interface 125 as a a sensor input unit which acquires sensor information as an output of a sensor which acquires information around the vehicle 1, an interface 125 as a movement information acquisition unit which acquires vehicle movement information 124A as information related to a movement of the vehicle 1, and an interface 125 as an in-vehicle communication unit which sends the vehicle movement information 124A and the sensor information 124B to the server 2. The server 2 comprises a server communication unit 214 which receives information based on the vehicle movement information and the sensor information from the in-vehicle processing device 120B, a map generation unit 121D which creates an environmental map including a drivable area where the vehicle can travel based on determination of static objects that do not move and mobile objects that can move by using information based on the vehicle movement information and the sensor information, and a route calculation unit 121E which calculates a travel route of the vehicle by using the environmental map. The server communication device 214 sends the environmental map and the travel route to the in-vehicle processing device 120B. The in-vehicle processing device 120B comprises an automatic processing unit 121F which controls the vehicle 1 by using the environmental map and the travel route. Thus, because the server 2 performs the post-processing phase of a high processing load in this embodiment, the in-vehicle processing device 120B can be realized using an inexpensive device having a low throughput.

Modified Example 1 of Third Embodiment

The server 2 may receive the vehicle movement information 124A and the sensor information 124B from a plurality of in-vehicle processing devices 120B, and thereby create the parking lot point group 124C. In the foregoing case, computation related to different in-vehicle processing devices 120B may be executed independently, or the computation result of one may be diverted to the other. For example, when the latitude and longitude sent from the in-vehicle processing devices 120B are substantially the same, there is a possibility that overlapping areas are included in their mutual environmental maps. In the foregoing case, the server 2 performs matching of the environmental maps, and calculates the route upon integrating the environmental maps when they are a match.

In each of the embodiments and modified examples explained above, the configuration of the functional blocks is merely an example. Several of the functional configurations indicated as separate functional blocks may be configured integrally, and the configuration represented as one functional block diagram may be divided into two or more functions. Moreover, the configuration may also be that a part of the function of each functional block is equipped in the other functional blocks.

In each of the embodiments and modified examples explained above, the programs are stored in the ROM 123, but the programs may also be stored in the storage unit 124. Moreover, the programs may also be read from another device via the interface 125 and a medium that can be used by the in-vehicle processing device 120 when required. Here, as the medium, for example, used may be a storage medium that can be attached to and detached from an input/output interface, or a communication medium such as a wired, wireless or optical network, or carrier waves or digital signals that are transmitted on such network. Moreover, a part or all of the functions realized by the programs may be realized with a hardware circuit or FPGA.

The embodiments and modified examples described above may be combined. While various embodiments and modified examples have been described above, the present invention is not limited thereto. Other embodiments conceivable within the scope of the technical concept of the present invention also fall within the scope of the present invention.

REFERENCE SIGNS LIST

1 . . . vehicle
2 . . . server
100, 100B . . . movement support system
102 . . . camera
108 . . . vehicle speed sensor
109 . . . steering angle sensor
110 . . . input device
111 . . . display device
114 . . . communication device
120, 120A, 120B . . . in-vehicle processing device
121 . . . computation unit
121A . . . sensor input unit
121B . . . movement information acquisition unit
121C . . . log recording unit
121D . . . map generation unit
121E . . . route calculation unit
121F . . . automatic processing unit
122B . . . local peripheral information
124 . . . storage unit
124A . . . vehicle movement information
124B . . . sensor information
124C . . . parking lot point group
125 . . . interface
131 . . . steering unit
132 . . . driving unit
133 . . . braking unit
214 . . . server communication unit
214 . . . server communication device
221 . . . computation unit
224 . . . storage unit

The invention claimed is:

1. An in-vehicle processing device for guiding a vehicle to a parking position in a parking lot comprising:
a sensor input circuit which acquires sensor information as an output of a sensor which acquires information around the vehicle;
a movement information acquisition circuit which acquires vehicle movement information from one or more movement sensors, as information related to a movement of the vehicle;
a log recording circuit which records information based on the vehicle movement information and the sensor information in a storage device;
a processor which calculates a parking lot coordinate system based on information about the parking lot stored in the storage device, and calculates a local coordinate system based on position and orientation of the vehicle from the vehicle movement information and the sensor information in a storage device;
a map generation circuit which performs a self-localization to estimate the position of the vehicle in the parking lot coordinate system and determines static objects that do not move and mobile objects that are capable of moving around the vehicle, by retrieving and using the vehicle movement information and the sensor information recorded in the storage device, and creates an environmental map which includes the determined static objects and a drivable area where the vehicle can travel and excludes the determined mobile objects based upon the vehicle movement information and the sensor information, wherein when a speed of the vehicle of the vehicle movement information and a speed of a subject of the sensor information differ relative to one another, the subject of the sensor information is determined as a mobile object of the mobile objects;
a route calculation circuit which calculates a travel route of the vehicle to the parking position by retrieving the environmental map from the storage device, wherein the environmental map includes information of the parking position as a position of parking the vehicle;
a calculation result recording circuit which records the environmental map and the travel route in the storage device; and
an automatic processing circuit which guides the vehicle to the parking position, by using the environmental map and the travel route, wherein
a first phase includes acquiring the sensor information and the vehicle movement information, recording the sensor information and the vehicle movement information, and calculating the parking lot coordinate system and the local coordinate system, and the first phase occurs after instructions to start recording are received,
a second phase includes creating the environmental map, the second phase occurs once the first phase is ended and after an ignition of the vehicle is turned off,
a third phase, which is different from the first phase and the second phase, includes calculating the travel route, recording the environmental map and the travel route and guiding the vehicle,
the first phase and the second phase occur at a timing different from the guiding the vehicle of the third phase, and
the third phase occurs after completion of the first phase and the second phase.

2. The in-vehicle processing device according to claim 1, wherein recording by the log recording circuit is ended when parking of the vehicle is completed, and wherein the map generation circuit and the route calculation circuit start their operation after parking of the vehicle is completed.

3. The in-vehicle processing device according to claim 1, wherein information based on the vehicle movement information is coordinates in a parking lot coordinate system based on the parking position.

4. The in-vehicle processing device according to claim 1, wherein information based on the vehicle movement information includes including steering information of the vehicle and speed information of the vehicle.

5. The in-vehicle processing device according to claim 1, wherein the route calculation circuit calculates a center in a width direction of the drivable area as the travel route.

6. The in-vehicle processing device according to claim 1, wherein recording by the log recording circuit is started from departure of the vehicle from the parking position.

7. The in-vehicle processing device according to claim 1, wherein the automatic processing circuit causes the vehicle parked at the parking position to move along the travel route by using the environmental map and the travel route.

8. The in-vehicle processing device according to claim 1, wherein the drivable area is an area to a landmark measured from the travel route.

9. The in-vehicle processing device according to claim 1, wherein
the drivable area includes information of links and nodes obtained by performing thinning processing to the drivable area, and
the route calculation circuit calculates the travel route of the vehicle to the parking position based on the information of links and nodes of the drivable area obtained from the environmental map.

10. The in-vehicle processing device according to claim 1, wherein the second phase further includes
obtaining a plurality of coordinates stored in the memory,
creating, via the processor, a plurality of links and nodes using the plurality of coordinates, and
calculating, based on the plurality of links and nodes, a shortest route from a recording starting point of the vehicle to the parking position.

11. A movement support system for guiding a vehicle to a parking position in a parking lot including an in-vehicle processing device mounted on the vehicle, and a server that is not mounted on the vehicle, comprising:
a sensor input circuit which acquires sensor information as an output of a sensor which acquires information around the vehicle;
a movement information acquisition circuit which acquires vehicle movement information from one or more movement sensors, as information related to a movement of the vehicle;
an in-vehicle communication circuit which sends information based on the vehicle movement information and the sensor information to the server;
a processor which calculates a parking lot coordinate system based on information about the parking lot stored in the storage device, and calculates a local coordinate system, based on position and orientation of the vehicle from the vehicle movement information and the sensor information in a storage device;
a server communication circuit which receives information based on the vehicle movement information and the sensor information from the in-vehicle processing device;
a map generation circuit which performs a self-localization to estimate the position of the vehicle in the parking lot coordinate system and determines static objects that do not move and mobile objects that are capable of moving around the vehicle, by retrieving and using the vehicle movement information and the sensor information recorded in the storage device, and creates an environmental map which includes the determined static objects and a drivable area where the vehicle can travel and excludes the determined mobile objects based upon the vehicle movement information and the sensor information, wherein when a speed of the vehicle of the vehicle movement information and a speed of a subject of the sensor information differ relative to one another, the subject of the sensor information is determined as a mobile object of the mobile objects;
a route calculation circuit which calculates a travel route of the vehicle to the parking position by retrieving the environmental map from the storage device, wherein the environmental map includes information of the parking position as a position of parking the vehicle, wherein the server communication circuit sends the environmental map and the travel route to the in-vehicle processing device; and an automatic processing circuit which controls the vehicle by using the environmental map and the travel route and guides the vehicle to the parking position, by using the environmental map and the travel route, and
a first phase includes acquiring the sensor information and the vehicle movement information, recording the sensor information and the vehicle movement information, and calculating the parking lot coordinate system and the local coordinate system, and the first phase occurs after instructions to start recording are received,
a second phase includes creating the environmental map, and the second phase occurs once the first phase is ended and after an ignition of the vehicle is turned off,
a third phase, which is different from the first phase and the second phase, includes calculating the travel route, recording the environmental map and the travel route and guiding the vehicle,
the first phase and the second phase occur at a timing different from the guiding the vehicle of the third phase, and
the third phase occurs after completion of the first phase and the second phase.

* * * * *